(12) United States Patent
Ishimatsu et al.

(10) Patent No.: US 11,018,389 B2
(45) Date of Patent: May 25, 2021

(54) BATTERY AND ELECTRONIC DEVICE

(71) Applicant: MURATA MANUFACTURING CO., LTD., Kyoto (JP)

(72) Inventors: Takahisa Ishimatsu, Kyoto (JP); Yukio Miyaki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 104 days.

(21) Appl. No.: 16/353,253

(22) Filed: Mar. 14, 2019

(65) Prior Publication Data

US 2019/0280253 A1    Sep. 12, 2019

Related U.S. Application Data

(63) Continuation of application No. PCT/JP2017/037394, filed on Oct. 16, 2017.

(30) Foreign Application Priority Data

Nov. 24, 2016 (JP) .............................. JP2016-227437

(51) Int. Cl.
*H01M 50/116* (2021.01)
*H01M 10/0585* (2010.01)
*H01M 10/0587* (2010.01)
*H01M 10/04* (2006.01)
*H01M 50/10* (2021.01)
*H01M 50/40* (2021.01)
*H01M 50/124* (2021.01)

(52) U.S. Cl.
CPC ......... *H01M 50/116* (2021.01); *H01M 10/04* (2013.01); *H01M 10/0585* (2013.01); *H01M 10/0587* (2013.01); *H01M 50/10* (2021.01); *H01M 50/124* (2021.01); *H01M 50/40* (2021.01)

(58) Field of Classification Search
CPC ............ H01M 2/0267; H01M 2/0287; H01M 10/0585; H01M 10/0587
USPC ........................................ 429/163, 176, 177
See application file for complete search history.

(56) References Cited

U.S. PATENT DOCUMENTS

2007/0196732 A1*  8/2007  Tatebayashi .......... H01M 2/263
                                                          429/181
2012/0058378 A1*  3/2012  Lee ...................... B32B 15/085
                                                          429/127

(Continued)

FOREIGN PATENT DOCUMENTS

JP          61-068868       9/1986
JP          H08171905 A     7/1996

(Continued)

OTHER PUBLICATIONS

Japanese Office Action dated Jul. 30, 2019 issued in related JP Patent Application No. 2018-552459 (3 Pages).

(Continued)

*Primary Examiner* — Sean P Cullen
(74) *Attorney, Agent, or Firm* — K&L Gates LLP

(57) ABSTRACT

A battery is provided. The battery includes a battery element; a film-like outer package member configured to accommodate the battery element; and a carbon fiber sheet provided between the battery element and the film-like outer package member, and the carbon fiber sheet includes long fibers.

15 Claims, 10 Drawing Sheets

(56) References Cited

U.S. PATENT DOCUMENTS

| | | | |
|---|---|---|---|
| 2013/0157111 A1* | 6/2013 | Chami | H01M 2/0275 429/157 |
| 2015/0333359 A1 | 11/2015 | Takahashi et al. | |
| 2016/0104871 A1* | 4/2016 | Kwon | H01M 2/0275 429/127 |

FOREIGN PATENT DOCUMENTS

| | | | |
|---|---|---|---|
| JP | 2004-012533 A | | 1/2004 |
| JP | 2006-073334 A | | 3/2006 |
| JP | 2012109268 A | | 6/2012 |
| JP | 2012155974 A | | 8/2012 |
| JP | 2015233004 A | | 12/2015 |
| JP | 2016-076359 A | | 5/2016 |
| KR | 20140052568 A | * | 5/2014 |

OTHER PUBLICATIONS

International Search Report for Application No. PCT/JP2017/037394, dated Jan. 16, 2018.
Extended European Search Report dated May 4, 2020 in corresponding European Application No. 17874926.3.

* cited by examiner

BATTERY AND ELECTRONIC DEVICE

CROSS REFERENCE TO RELATED APPLICATIONS

The present application is a continuation of PCT patent application no. PCT/JP2017/037394, filed on Oct. 16, 2017, which claims priority to Japanese patent application no. JP2016-227437 filed on Nov. 24, 2016, the entire contents of which are being incorporated herein by reference.

BACKGROUND

The present technology generally relates to a battery and an electronic device.

In recent years, the application of secondary batteries is expanding to portable devices such as mobile phones, tablet computers, and small electric power tools, as well as electric vehicles such as electric bicycles and hybrid cars. As one of the secondary batteries, a lithium ion secondary battery is widely known.

SUMMARY

In the field of secondary batteries, it is generally desirable to improve the impact resistance in order to prevent the following phenomenon: a secondary battery is deformed by impact, whereby a short (short circuit) occurs between a positive electrode and a negative electrode, and the secondary battery generates heat.

Accordingly, an object of the present technology is to provide a battery in which impact resistance is improved and high stability against external forces is ensured, and an electronic device.

According to an embodiment of the present technology, a battery is provided. The battery includes a battery element; a film-like outer package member configured to accommodate the battery element; and a carbon fiber sheet provided between the battery element and the film-like outer package member, where the carbon fiber sheet includes long fibers.

According to an embodiment of the present technology, an electronic device is provided. The electronic device includes a battery as described herein.

According to at least an embodiment of the present technology, it is possible to improve the impact resistance of the battery without increasing the weight of the battery as much as possible. The effects described herein are not necessarily limited, and may be any of the effects described in the present technology. Further, it should be understood that the contents of the present technology should not be interpreted to be limited by the exemplified effects and other suitable properties relating to the present technology may be realized and as further described.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
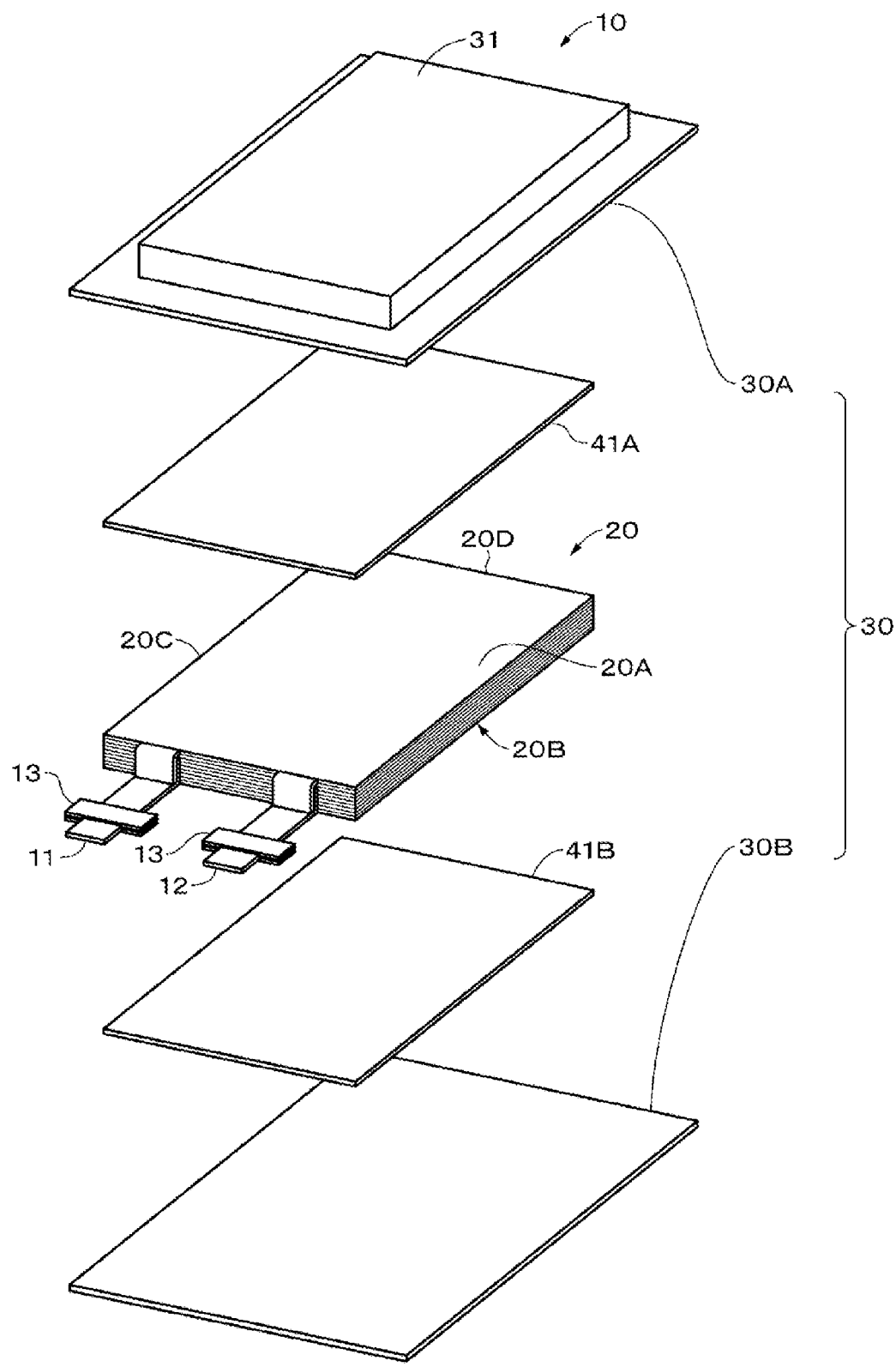
FIG. 1 is an exploded perspective view of a battery according to an embodiment of the present technology.

FIG. 1 is an exploded perspective view illustrating a configuration example of a nonaqueous electrolyte secondary battery (hereinafter simply referred to as "battery") 10 according to one embodiment of the present technology. As shown in FIG. 1, the battery 10 according to one embodiment of the present technology is a so-called laminate film type battery in which a laminate type electrode body having a flat or rectangular shape (hereinafter appropriately abbreviated as "electrode body") 20, as an example of a battery element, a carbon fiber sheet 41A, and a carbon fiber sheet 41B are housed in a film-like outer package member 30, and it is possible to reduce the size, weight, and thickness of the battery.

A positive electrode lead 11 and a negative electrode lead 12 are attached to the electrode body 20. The electrode body 20 has a main surface 20A having a substantially rectangular shape in a top view and a main surface 20B opposite to the main surface 20A. The main surface 20A has a side portion 20C in the longitudinal direction and a side portion 20D in the lateral direction. Each of the carbon fiber sheets 41A and 41B is provided between the outer package member 30 and the electrode body 20.

The positive electrode lead 11 and the negative electrode lead 12 are led out in the same direction from one short side of the battery 10. Hereinafter, the short side of the electrode body 20 from which the positive electrode lead 11 and the negative electrode lead 12 are led out is referred to as "top side", and the short side opposite thereto is referred to as "bottom side". Further, the long side is referred to as "lateral side".

The positive electrode lead 11 and the negative electrode lead 12 have, for example, a thin plate shape or a mesh shape. The positive electrode lead 11 and the negative electrode lead 12 are made of, for example, a metal material such as aluminum, copper, nickel or stainless.

Adhesive films 13 for preventing the intrusion of outside air are inserted between the outer package member 30 and the positive electrode lead 11 and between the outer package member 30 and the negative electrode lead 12, respectively. Each of the adhesive films 13 is made of a material having adhesion to the positive electrode lead 11 and the negative electrode lead 12 (e.g., a polyolefin resin such as polyethylene, polypropylene, modified polyethylene or modified polypropylene).

The outer package member 30 is a laminate film having flexibility. The outer package member 30 includes a first outer package member 30A and a second outer package member 30B, both of which have a rectangular film-like shape.

The first outer package member 30A and the second outer package member 30B have the same size and are overlapped so as to sandwich the electrode body 20 therebetween. Four sides of the overlapped first and second outer package members 30A and 30B are fused to one another to form fused portions on the peripheral portions of the first and second outer package members 30A and 30B. The first outer package member 30A has a housing portion 31 for housing the electrode body 20. The housing portion 31 is formed by deep drawing, for example.

The outer package member 30 has, for example, a configuration in which a thermal fusion resin layer, a metal layer, and a surface protective layer are sequentially laminated. The surface on the side of the thermal fusion resin layer is the surface on the side in which the electrode body 20 is housed. Examples of the material of the thermal fusion resin layer include polypropylene (PP) and polyethylene (PE). Examples of the material of the metal layer include aluminum. Examples of the material of the surface protective layer include nylon (Ny). Specifically, the outer package member 30 is made of a rectangular aluminum laminate film obtained by laminating, for example, a nylon film, an aluminum foil, and a polyethylene film in this order. The outer package member 30 is disposed, for example, such that the side of the thermal fusion resin layer and the electrode body 20 are opposed to each other, and the respective outer edges are closely contacted to each other by fusion bonding or an adhesive.

The outer package member 30 may include a laminate film having another structure, a polymer film such as a polypropylene film or a metal film, in place of the above-mentioned laminate film. Alternatively, a laminate film obtained by laminating a polymer film on one side or both sides of an aluminum film as a core material may be used.

From the viewpoint of beauty of appearance, an outer package member which further includes a coloring layer and/or an outer package member in which a coloring material is contained in at least one layer selected from a thermal fusion resin layer and a surface protective layer may be used as the outer package member 30. In the case where an adhesive layer is formed at least one of between the thermal fusion resin layer and the metal layer and between the surface protective layer and the metal layer, the adhesive layer may contain the coloring material.

The carbon fiber sheet 41A is formed between the first outer package member 30A and the main surface 20A of the electrode body 20, and the carbon fiber sheet 41B is formed between the second outer package member 30B and the main surface 20B of the electrode body 20. Unless otherwise specified, the carbon fiber sheet 41A will be described, and the same applies to the carbon fiber sheet 41B.

The carbon fiber sheet 41A is made of carbon fibers. As the carbon fibers, known carbon fibers such as polyacrylonitrile-based carbon fibers or pitch-based carbon fibers may be used. The carbon fiber sheet in the present technology includes long fibers. For example, the long fibers are carbon fibers having a length of 50% to 120% or more with respect to the length of the side portion 20D of the main surface 20A. The long fibers are a woven fabric or a nonwoven fabric. As a method of forming each of the long fibers into a sheet, widely known methods may be used. The long fibers having a uniform arrangement direction are impregnated with a resin as a binder, and thus the long fibers are formed into a sheet. It is also possible to knit long fibers into a sheet, for example. In this case, it is unnecessary to mix the long fibers with plastics or the like, and it is possible to obtain a carbon fiber sheet not containing (un-containing) a binder.

The fiber diameter of the long fibers is, for example, from 1 to 100 μm, and preferably from 5 to 20 μm. A plurality of long fibers may constitute a bundle (filament). A plurality of filaments may also form a bundle. Further, in the carbon fiber sheet 41A according to one embodiment, the long fibers are arranged in at least two directions, more specifically in two directions substantially perpendicular to each other. Accordingly, the strength of the carbon fiber sheet 41A can be ensured, and the impact resistance of the battery 10 can be improved. From the same viewpoint, it is preferable that the covering ratio of each of the carbon fiber sheets 41A and 41B to the entire surface of the electrode body 20 is, for example, 70% or more and 110% or less. From the viewpoint of ensuring the capacity of the battery, the average thickness of the carbon fiber sheet 41A is 20 μm or more and 200 μm or less, and preferably 20 μm or more and 150 μm or less.

Figure 2:
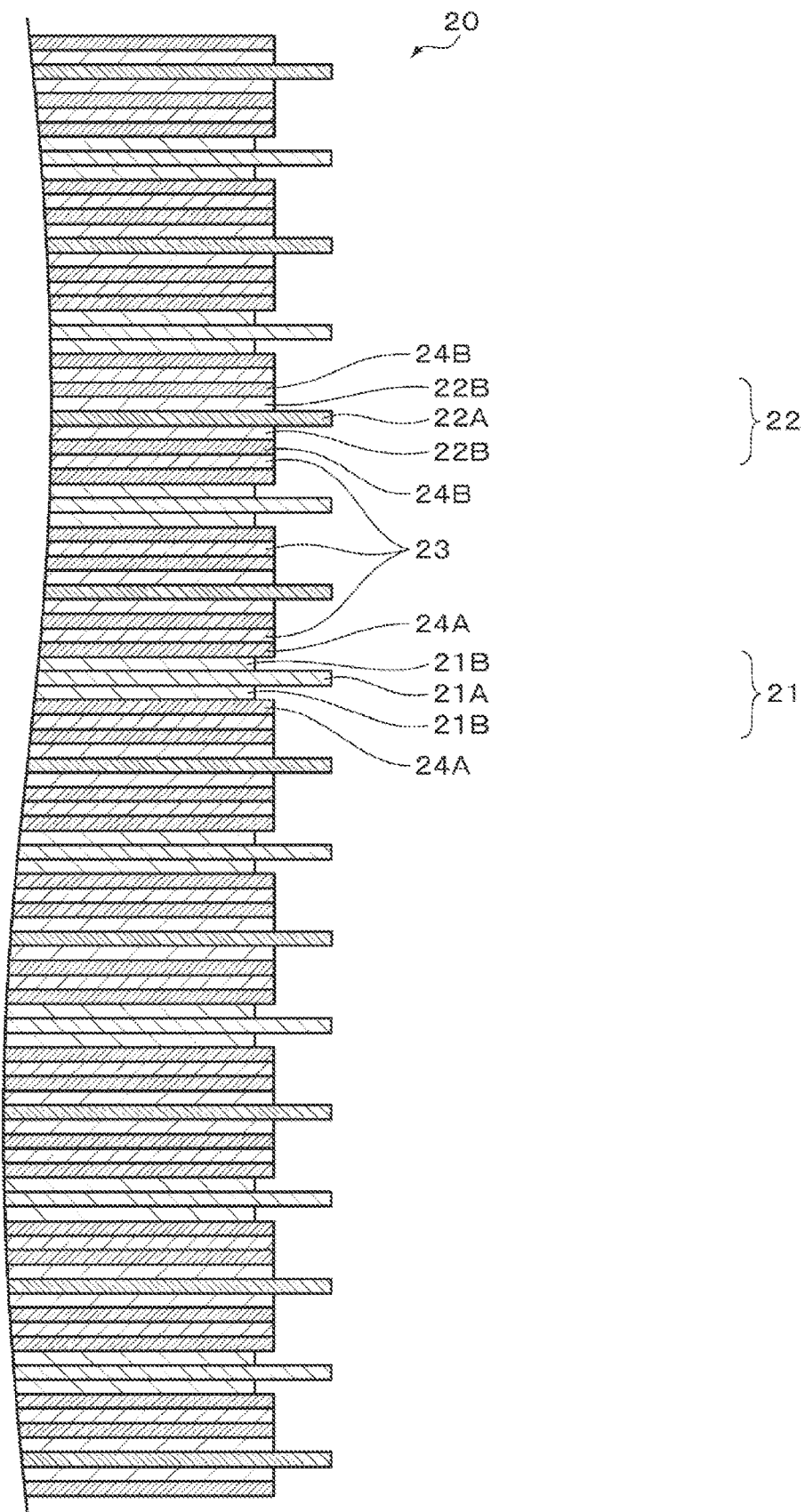
FIG. 2 is a view for explaining a configuration of an electrode body according to an embodiment of the present technology.

FIG. 2 shows an example of the configuration of the electrode body 20. The electrode body 20 includes a positive electrode 21, a negative electrode 22, a separator 23 provided between the positive electrode 21 and the negative electrode 22, an electrolyte layer 24A provided between the positive electrode 21 and the separator 23, and an electrolyte layer 24B provided between the negative electrode 22 and the separator 23.

The positive electrode 21 has a structure in which a positive electrode active material layer 21B is provided on both sides of a positive electrode current collector 21A. Although not shown, the positive electrode active material layer 21B may be provided only on one side of the positive electrode current collector 21A.

Figure 3A:
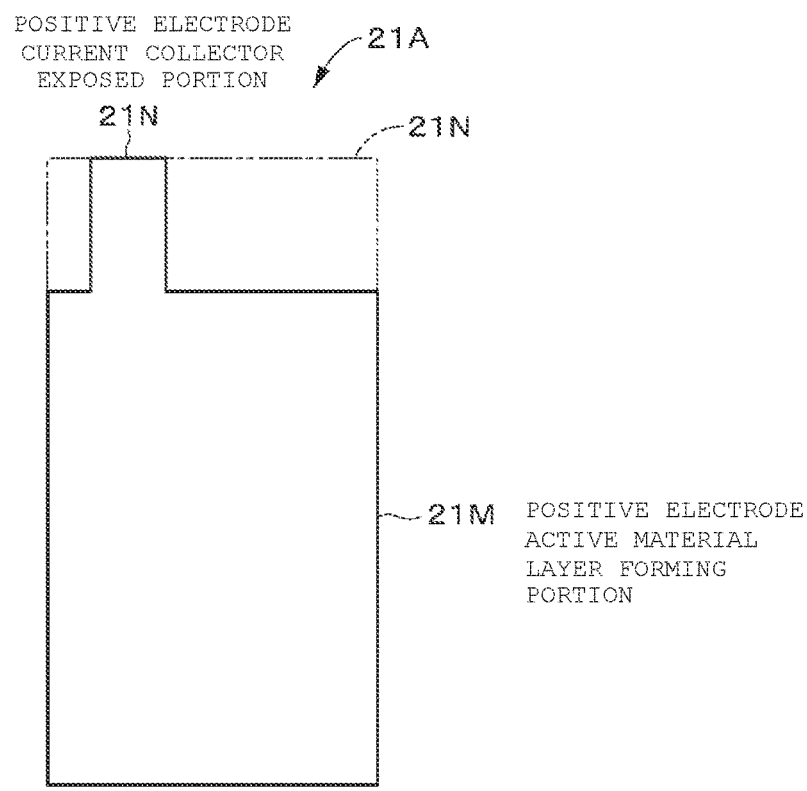
FIG. 3A is a view for explaining a positive electrode current collector according to an embodiment of the present technology.

As shown in FIG. 3A, the positive electrode current collector 21A includes a positive electrode active material layer forming portion 21M and a positive electrode current collector exposed portion 21N. When the positive electrode active material layer forming portion 21M is planarly viewed from the direction perpendicular to the main surface of the positive electrode current collector 21A, the positive electrode active material layer forming portion 21M has a rectangular shape. The positive electrode active material layer 21B is provided on both sides of the positive electrode active material layer forming portion 21M. The positive electrode current collector exposed portion 21N extends from a part of one side of the positive electrode active material layer forming portion 21M. As shown by a two-dot chain line in FIG. 3A, the positive electrode current collector exposed portion 21N may extend from the whole of one side of the positive electrode active material layer forming portion 21M. In a state where the positive electrode 21, the negative electrode 22, and the separator 23 are laminated, a plurality of the positive electrode current collector exposed portions 21N is joined and the joined positive electrode current collector exposed portion 21N is electrically connected to the positive electrode lead 11.

The positive electrode current collector 21A includes, for example, a metal foil such as an aluminum foil, a nickel foil or a stainless steel foil. The positive electrode active material layer 21B contains, for example, a positive electrode active material capable of occluding and releasing lithium which is an electrode reactant. The positive electrode active material layer 21B may further contain an additive, if necessary. As the additive, for example, at least one of a conductive agent and a binding agent can be used.

As the positive electrode material capable of occluding and releasing lithium (Li), for example, a lithium-containing compound such as a lithium oxide, a lithium phosphorus oxide, a lithium sulfide or an intercalation compound containing lithium is suitable, and two or more of these compounds may be mixed and used. In order to increase the energy density, a lithium-containing compound including lithium (Li), a transition metal element, and oxygen (O) is preferred. Example of the lithium-containing compound include a lithium composite oxide having a layered rock salt type structure shown in the formula (A) and a lithium composite phosphate having an olivine type structure shown in the formula (B). It is more preferable that the lithium-containing compound contains at least one of the group consisting of cobalt (Co), nickel (Ni), manganese (Mn), and iron (Fe) as the transition metal element. Examples of the lithium-containing compound include a lithium composite oxide having a layered rock salt type structure shown in the formula (C), (D) or (E), a lithium composite oxide having a spinel type structure shown in the formula (F), and a lithium composite phosphate having an olivine type structure shown in the formula (G). Specific examples of the lithium-containing compound include $LiNi_{0.50}Co_{0.20}Mn_{0.30}O_2$, $Li_aCoO_2$ ($a\approx1$), $Li_bNiO_2$ ($b\approx1$), $Li_{c1}Ni_{c2}Co_{1-c2}O_2$ ($c1\approx1$, $0<c2<1$), $Li_dMn_2O_4$ ($d\approx1$), and $Li_eFePO_4$ ($e\approx1$).

$$Li_pNi_{(1-q-r)}Mn_qM1_rO_{(2-y)}X_z \quad (A)$$

(In the formula (A), M1 represents at least one of elements selected from Group 2 to Group 15 excluding nickel (Ni) and manganese (Mn). X represents at least one of elements of Group 16 and Group 17 other than oxygen. p, q, y, and z are values within ranges of $0\leq p\leq1.5$, $0\leq q\leq1.0$, $0\leq r\leq1.0$, $-0.10\leq y\leq0.20$, and $0\leq z\leq0.2$.)

$$Li_aM2_bPO_4 \quad (B)$$

(In the formula (B), M2 represents at least one of elements selected from Group 2 to Group 15. a and b are values within ranges of $0\leq a\leq2.0$ and $0.5\leq b\leq2.0$.)

$$Li_jMn_{(l-g-h)}Ni_gM3_hO_{(2-j)}F_k \quad (C)$$

(In the formula (C), M3 represents at least one of the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). f, g, h, j, and k are within ranges of $0.8\leq f\leq1.2$, $0<g<0.5$, $0\leq h\leq0.5$, $g+h<1$, $-0.1\leq j\leq0.2$, and $0\leq k\leq0.1$. However, the composition of lithium (Li) varies depending on the charge/discharge state, and the value of f indicates the value in a full discharge state.)

$$Li_mNi_{(1-n)}M4_nO_{(2-p)}F_q \quad (D)$$

(In the formula (D), M4 represents at least one of the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). m, n, p, and q are values within ranges of $0.8\leq m\leq1.2$, $0.005\leq n\leq0.5$, $-0.1\leq p\leq0.2$, and $0\leq q\leq0.1$. The composition of lithium (Li) varies depending on the charge/discharge state, and the value of m indicates the value in a full discharge state.)

$$Li_rCo_{(1-s)}M5_sO_{(2-t)}F_u \quad (E)$$

(In the formula (E), M5 represents at least one of the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). r, s, t, and u are values within ranges of $0.8\leq r\leq1.2$, $0\leq s<0.5$, $-0.1\leq t\leq0.2$, and $0\leq u\leq0.1$. The composition of lithium (Li) varies depending on the charge/discharge state, and the value of r indicates the value in a full discharge state.)

$$Li_vMn_{2-w}M6_wO_xF_y \quad (F)$$

(In the formula (F), M6 represents at least one of the group consisting of cobalt (Co), Nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). v, w, x, and y are values within ranges of $0.9\leq v\leq1.1$, $0\leq w\leq0.6$, $3.7\leq x\leq4.1$, and $0\leq y\leq0.1$. The composition of lithium (Li) varies depending on the charge/discharge state, and the value of v indicates the value in a full discharge state.)

$$Li_zM7PO_4 \quad (G)$$

(In the formula (G), M7 represents at least one of the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). z is a value within a range of $0.9\leq z\leq1.1$. The composition of lithium (Li) varies depending on the charge/discharge state, and the value of z indicates the value in a full discharge state.)

As the lithium composite oxide containing Ni, a lithium composite oxide (NCM) containing lithium (Li), nickel (Ni), cobalt (Co), manganese (Mn), and oxygen (O), a lithium composite oxide (NCA) containing lithium (Li), nickel (Ni), cobalt (Co), aluminum (Al), and oxygen (O), or the like may be used. Specifically, a lithium composite oxide containing Ni represented by the following formula (H) or (I) may be used.

$$Li_{v1}Ni_{w1}M1'_{x1}O_{z1} \quad (H)$$

(where, $0<v1<2$, $w1+x1\leq1$, $0.2\leq w1\leq1$, $0\leq x1\leq0.7$, $0<z<3$, and M1' represents at least one or more elements consisting of transition metals such as cobalt (Co), iron (Fe), manganese (Mn), copper (Cu), zinc (Zn), aluminum (Al), chromium (Cr), vanadium (Ba), titanium (Ti), magnesium (Mg), and zirconium (Zr).)

$$Li_{v2}Ni_{w2}M2'_{x2}O_{z2} \quad (I)$$

(where, $0<v2<2$, $w2+x2\leq1$, $0.65\leq w2\leq1$, $0\leq x2\leq0.35$, $0<z2<3$, and M2' represents at least one or more elements consisting of transition metals such as cobalt (Co), iron (Fe), manganese (Mn), copper (Cu), zinc (Zn), aluminum (Al), chromium (Cr), vanadium (Ba), titanium (Ti), magnesium (Mg), and zirconium (Zr).)

Other examples of the positive electrode material capable of occluding and releasing lithium (Li) include inorganic compounds containing no lithium, such as $MnO_2$, $V_2O_5$, $V_6O_{13}$, NiS, and MoS.

The positive electrode material capable of occluding and releasing lithium (Li) may be other than the above-described materials. Further, two or more kinds of the positive electrode materials exemplified above may be mixed in arbitrary combination.

As the binding agent, for example, at least one selected from resin materials such as polyvinylidene fluoride (PVdF), polytetrafluoroethylene (PTFE), polyacrylonitrile (PAN), styrene butadiene rubber (SBR), carboxymethylcellulose (CMC), and copolymers mainly formed of these resin materials is used.

Examples of the conductive agent include carbon materials such as graphite, carbon black, and ketjen black, and one or two or more kinds thereof are used in mixture. Besides the carbon materials, a metal material, a conductive polymer material, or the like may be used as long as the material has conductivity.

The negative electrode 22 has a structure in which the negative electrode active material layer 22B is provided on both sides of the negative electrode current collector 22A, and is arranged so that the negative electrode active material layer 22B and the positive electrode active material layer 21B are opposed to each other. Although not shown, the negative electrode active material layer 22B may be provided only on one side of the negative electrode current collector 22A.

Figure 3B:
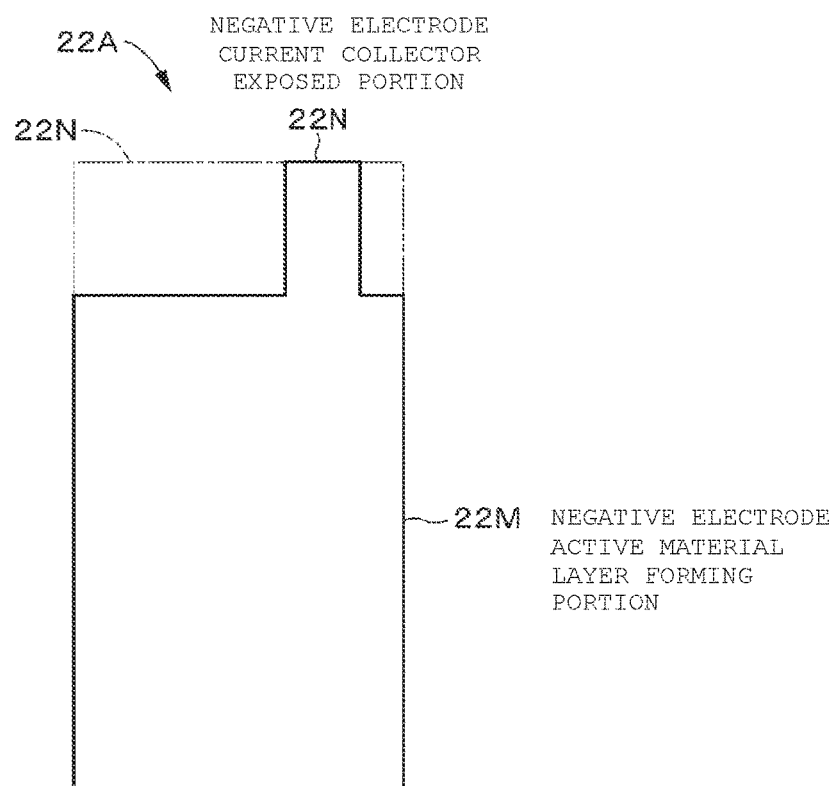
FIG. 3B is a view for explaining a negative electrode current collector according to an embodiment of the present technology.

As shown in FIG. 3B, the negative electrode current collector 22A includes a negative electrode active material layer forming portion 22M and a negative electrode current collector exposed portion 22N. When the negative electrode active material layer forming portion 22M is planarly viewed from the direction perpendicular to the main surface of the negative electrode current collector 22A, the negative electrode active material layer forming portion 22M has a rectangular shape. The negative electrode active material layer 22B is provided on one side or both sides of the negative electrode active material layer forming portion 22M. The negative electrode current collector exposed portion 22N extends from a part of one side of the negative electrode active material layer forming portion 22M. As shown by a two-dot chain line in FIG. 3B, the negative electrode current collector exposed portion 22N may extend from the whole of one side of the negative electrode active material layer forming portion 22M. In a state where the positive electrode 21, the negative electrode 22, and the separator 23 are laminated, a plurality of the negative electrode current collector exposed portions 22N is joined and the joined negative electrode current collector exposed portion 22N is electrically connected to the negative electrode lead 12.

The negative electrode current collector 22A includes, for example, a metal foil such as a copper foil, a nickel foil, or a stainless foil. The negative electrode active material layer 22B contains one or two or more kinds of negative electrode active materials capable of occluding and releasing lithium (Li). The negative electrode active material layer 22B may further contain additives such as a binding agent and a conductive agent, if necessary.

In the battery 10, it is preferable that the electrochemical equivalent of the negative electrode 22 or the negative electrode active material is larger than the electrochemical equivalent of the positive electrode 21, and theoretically, a lithium metal is not deposited on the negative electrode 22 during charging.

Examples of the negative electrode active material include non-graphitizable carbon, graphitizable carbon, graphite, pyrolytic carbons, cokes, glassy carbons, organic polymer compound fired bodies, and carbon materials such as carbon fiber or activated carbon. Among these materials, cokes are, for example, pitch cokes, needle cokes, or petroleum cokes. The term "organic polymer compound fired body" means a fired body obtained by firing a polymer material such as a phenol resin or a furan resin at an appropriate temperature and carbonizing the resultant material, and some of the fired bodies are classified into non-graphitizable carbon or graphitizable carbon. These carbon materials are preferable because very little change occurs in the crystal structure generated during charging/discharging, a high charge/discharge capacity can be obtained, and good cycle characteristics can be obtained. In particular, graphite is preferable because it has a large electrochemical equivalent and a high energy density can be achieved. Further, non-graphitizable carbon is preferable because excellent cycle characteristics can be obtained. Furthermore, a carbon material having a low charge-discharge potential, specifically a carbon material having a charge-discharge potential close to that of lithium metal is preferable because a high energy density of the battery 10 is easily realized.

Further, examples of another negative electrode active material capable of increasing the capacity include a material that contains at least one of a metal element and a metalloid element as a constituent element (e.g., an alloy, a compound, or a mixture). This is because a high energy density can be achieved when such a material is used. Particularly, it is more preferable to use such a material together with a carbon material because a high energy density and excellent cycle characteristics can be achieved. In the present technology, the term "alloy" includes alloys containing two or more kinds of metal elements and also alloys containing one or more kinds of metal elements and one or more kinds of metalloid elements. Further, these alloys may also contain a non-metal element. Tissues of these alloys include a solid solution, a eutectic crystal (eutectic mixture) or an intermetallic compound, and two or more thereof may coexist.

Examples of the negative electrode active material include a metal element or a metalloid element capable of forming an alloy with lithium (Li). Specific examples of the negative electrode active material include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These metal and metalloid elements may be crystalline or amorphous.

The negative electrode active material preferably contains a metal element or a metalloid element of Group 4B in the short period periodic table as a constituent element, and more preferably contains at least one of silicon (Si) and tin (Sn) as a constituent element. This is because silicon (Si) and tin (Sn) have a large capability of occluding and releasing lithium (Li), and a high energy density can be achieved. Examples of the negative electrode active material include a simple substance, an alloy or a compound of silicon (Si), a simple substance, an alloy or a compound of tin (Sn), and a material including at least a part of a phase including one or two or more kinds thereof.

Examples of the alloy of silicon (Si) include an alloy containing at least one of the group consisting of tin (Sn), nickel (Ni), copper (Cu), iron (Fe), cobalt (Co), manganese (Mn), zinc (Zn), indium (In), silver (Ag), titanium (Ti), germanium (Ga), bismuth (Bi), antimony (Sb), and chromium (Cr) as a second constituent element other than silicon (Si). Examples of the alloy of tin (Sn) include an alloy containing at least one of the group consisting of silicon (Si), nickel (Ni), copper (Cu), iron (Fe), cobalt (Co), manganese (Mn), zinc (Zn), indium (In), silver (Ag), titanium (Ti), germanium (Ga), bismuth (Bi), antimony (Sb), and chromium (Cr) as a second constituent element other than tin (Sn).

Examples of the compound of tin (Sn) or the compound of silicon (Si) include compounds containing oxygen (O) or carbon (C), and the compound of tin (Sn) or the compound of silicon (Si) may contain the above-mentioned second constituent element in addition to tin (Sn) or silicon (Si).

Among these materials, a SnCoC-containing material which contains cobalt (Co), tin (Sn), and carbon (C) as constituent elements and in which the content of carbon is 9.9 mass % or more and 29.7 mass % or less and the proportion of cobalt (Co) to the total of tin (Sn) and cobalt (Co) is 30 mass % or more and 70 mass % or less, is preferable as the Sn-based negative electrode active material. This is because a high energy density and excellent cycle characteristics can be achieved in such a composition range.

This SnCoC-containing material may further contain other constituent elements, if necessary. As other constituent elements, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga) or bismuth (Bi) are preferable, and two or more kinds of the elements may be contained. This is because the capacity or cycle characteristics can be further improved.

The SnCoC-containing material has a phase containing tin (Sn), cobalt (Co), and carbon (C), and this phase preferably has a low crystalline or amorphous structure. Further, in the SnCoC-containing material, the carbon as a constituent element is preferably at least partially bonded to a metal element or a metalloid element which is another constituent element. This is because the cycle characteristics may be lowered due to aggregation or crystallization of tin or the like, and carbon (C) is bonded to other elements, making it possible to suppress such aggregation or crystallization.

Examples of measurement methods for examining the bonding state of elements include X-ray photoelectron spectroscopy (XPS). In this XPS, so far as graphite is concerned, a peak of the 1s orbit of carbon (C1s) appears at 284.5 eV in an energy-calibrated apparatus such that a peak of the 4f orbit of a gold atom (Au4f) is obtained at 84.0 eV. Also, so far as surface-contaminated carbon is concerned, the peak appears at 284.8 eV. On the other hand, when a charge density of the carbon element is high, for example, when carbon is bonded to a metal element or a metalloid element, the peak of C1s appears in a region lower than 284.5 eV. That is, when a peak of a combined wave of C1s obtained on the SnCoC-containing material appears in a region lower than 284.5 eV, at least a part of carbon contained in the SnCoC-containing material is bonded to a metal element or a metalloid element as another constituent element.

In the XPS measurement, for example, the peak of C1s is used for correcting the energy axis of a spectrum. Usually, since surface-contaminated carbon is present on the surface, the peak of C1s of the surface-contaminated carbon is fixed at 284.8 eV, and this peak is used as an energy reference. In the XPS measurement, a waveform of the peak of C1s is obtained as a form including the peak of the surface-contaminated carbon and the peak of the carbon in the SnCoC-containing material, so the peak of the surface-contaminated carbon and the peak of the carbon in the SnCoC-containing material are separated by, for example, analysis with use of commercially available software. In the analysis of the waveform, the position of the main peak present on the lowest binding energy side is determined to be an energy reference (284.8 eV).

Examples of other negative electrode active materials include metal oxides and polymer compounds, each of which is capable of occluding and releasing lithium (Li). Examples of the metal oxides include a lithium titanium oxide containing titanium (Ti) and lithium (Li) such as lithium titanate ($Li_4Ti_5O_{12}$), iron oxide, ruthenium oxide, and molybdenum oxide. Examples of the polymer compounds include polyacetylene, polyaniline, and polypyrrole.

As the binding agent, for example, at least one selected from resin materials such as polyvinylidene fluoride, polytetrafluoroethylene, polyacrylonitrile, styrene butadiene rubber, carboxymethylcellulose, and copolymers mainly formed of these resin materials is used. As the conductive agent, a carbon material similar to the positive electrode active material layer 21B can be used.

When the separator 23 is planarly viewed from a direction perpendicular to the main surface thereof, the separator 23 has a rectangular shape. The size of the separator 23 is larger than the sizes of the positive electrode 21 and the negative electrode 22. When the electrode body 20 is planarly viewed from a direction perpendicular to the main surface thereof, the periphery of the separator 23 is located outside the peripheries of the positive and negative electrodes 21 and 22.

The separator 23 allows lithium ions to pass while preventing a short circuit of the current caused by the contact between the positive electrode 21 and the negative electrode 22. The separator 23 is, for example, a porous membrane made of synthetic resin consisting of polyethylene, polypropylene, polytetrafluoroethylene, a mixture or copolymer thereof or the like, or a porous membrane made of ceramic, and may be a laminate of two or more of these porous membranes. Above all, a polyolefin porous membrane is preferable because the membrane has an excellent short circuit prevention effect and is capable of improving the safety of the battery 10 due to the shutdown effect at high temperature. Particularly, a polyethylene porous membrane is preferable.

The electrolyte layers 24A and 24B include a nonaqueous electrolytic solution and a polymer compound as a resin material for holding the nonaqueous electrolytic solution, and the polymer compound is swollen by the nonaqueous electrolytic solution. The content ratio of the polymer compound can be appropriately adjusted. The polymer compound swollen by the nonaqueous electrolytic solution may be in the form of a gel. A gel electrolyte is preferable because a high ion conductivity can be obtained and liquid leakage of the battery 10 can be prevented.

The nonaqueous electrolytic solution contains a nonaqueous solvent and an electrolyte salt. The nonaqueous electrolytic solution may further contain known additives in order to improve battery characteristics.

Examples of the nonaqueous solvent include ethylene carbonate, propylene carbonate, butylene carbonate, vinylene carbonate, dimethyl carbonate, diethyl carbonate, ethyl methyl carbonate, 4-fluoro-1,3-dioxolane-2-one, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, ethyl acetate, methyl propionate, ethyl propionate, propyl propionate, acetonitrile, succinonitrile, adiponitrile, methoxyacetonitrile, 3-methoxypropionitrile, N,N-dimethylformamide, N-methylpyrrolidinone, N-methyl oxazolicinone, nitromethane, nitroethane, sulfolane, dimethylsulfoxide, trimethyl phosphate, triethyl phosphate, ethylene sulfide, and propane sultones. Above all, at least one of the group consisting of 4-fluoro-1,3-dioxolane-2-one, ethylene carbonate, propylene carbonate, vinylene carbonate, dimethyl carbonate, and ethyl methyl carbonate is mixed and used, whereby excellent charge/discharge capacity characteristics and charge/discharge cycle characteristics can be preferably obtained.

The electrolyte salt contains one or two or more kinds of lithium salts. Examples of the lithium salt include lithium hexafluorophosphate, lithium tetrafluoroborate, lithium hexafluoroarsenate, lithium perchlorate, lithium trifluoromethanesulfonate, lithium bis(trifluoromethanesulfonyl)imide, lithium bis(pentafluoroethanesulfonyl)imide, lithium tris(trifluoromethanesulfonyl)methyl, lithium chloride, and lithium bromide.

Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polyacrylic acid, polymethacrylic acid, polymethylmethacrylate, styrene-butadiene rubber, nitrile-butadiene rubber, polystyrene, and polycarbonate. In particular, polyacrylonitrile, polyvinylidene fluoride, polyhexafluoropropylene or polyethylene oxide is preferred from the viewpoint of electrochemical stability.

In the battery 10 according to one embodiment, the open circuit voltage (i.e., the battery voltage) in a full charge state per pair of the positive electrode 21 and the negative electrode 22 may be 4.2 V or less, but may be designed so as to be higher than 4.2 V, preferably 4.4 V or more and 6.0 V or less, and more preferably 4.4 V or more and 5.0 V or less. A high energy density can be achieved by increasing the battery voltage.

When the battery 10 having the above-mentioned configuration is charged, for example, lithium ions are released from the positive electrode active material layer 21B, and occluded in the negative electrode active material layer 22B via the electrolytic solution. Further, when the battery 10 is discharged, for example, lithium ions are released from the negative electrode active material layer 22B, and occluded in the positive electrode active material layer 21B via the electrolytic solution.

Subsequently, an example of the method of producing the battery 10 according to one embodiment of the present technology will be described.

The positive electrode 21 is produced in the following manner. First, for example, a positive electrode mixture is prepared by mixing a positive electrode active material, a conductive agent, and a binding agent, and this positive electrode mixture is dispersed in a solubilizing agent such as N-methyl-2-pyrrolidone (NMP), to prepare a paste-like positive electrode mixture slurry. Next, the positive electrode mixture slurry is applied to one side of the band-like positive electrode current collector 21A, and the solubilizing agent is dried and compression-molded by a roll press machine or the like to form the positive electrode active material layer 21B, thereby forming the band-like positive electrode 21.

At this time, a portion in which the positive electrode current collector 21A is exposed is left at one end in the width direction of the positive electrode 21.

Then, a precursor solution containing a nonaqueous solvent, an electrolyte salt, a polymer compound, and a solubilizing agent is applied to the positive electrode active material layer 21B, and the solubilizing agent is volatilized to form the electrolyte layer 24A. After that, the positive electrode 21 is cut so as to leave the positive electrode current collector exposed portion 21N at one end of the positive electrode active material layer 21B. The electrolyte layer 24A may be formed after cutting the positive electrode 21.

The negative electrode 22 is produced in the following manner. First, a negative electrode mixture is prepared by mixing, for example, a negative electrode active material and a binding agent, and the negative electrode mixture is dispersed in a solubilizing agent such as N-methyl-2-pyrrolidone (NMP) or methyl ethyl ketone (MEK) to produce a paste-like negative electrode mixture slurry. Next, the negative electrode mixture slurry is applied to one side of the band-like negative electrode current collector 22A, and the solubilizing agent is dried and compression-molded by a roll press machine or the like to form the negative electrode active material layer 22B, thereby forming the band-like negative electrode 22. At this time, a portion in which the negative electrode current collector 22A is exposed is left at one end in the width direction of the negative electrode 22.

Then, a precursor solution containing a solvent, an electrolyte salt, a polymer compound, and a solubilizing agent is applied to the negative electrode active material layer 22B, and the solubilizing agent is volatilized to form the electrolyte layer 24B. After that, the negative electrode 22 is cut so as to leave the positive electrode current collector exposed portion 21N at one end of the negative electrode active material layer 22B. The electrolyte layer 24B may be formed after cutting the negative electrode 22.

The electrode body 20 is produced in the following manner. First, a microporous polypropylene film or the like is cut into a rectangular shape to produce the separator 23. Next, a plurality of the positive electrodes 21, a plurality of the negative electrodes 22, and a plurality of the separators 23, obtained as mentioned above, are laminated in the following order: the separator 23, the positive electrode 21, the separator 23, the negative electrode 22, the separator 23, . . . , the separator 23, the negative electrode 22, the separator 23, the positive electrode 21, and the separator 23 as shown in FIG. 2, thereby forming the laminate type electrode body 20.

Next, the positive electrode current collector exposed portions 21N of the plurality of laminated positive electrodes 21 are joined with each other, and the positive electrode lead 11 is electrically connected to the joined positive electrode current collector exposed portion 21N. Further, the negative electrode current collector exposed portions 22N of the plurality of laminated negative electrodes 22 are joined with each other, and the negative electrode lead 12 is electrically connected to the joined negative electrode current collector exposed portion 22N. Examples of the connection method include ultrasonic welding, resistance welding, and soldering. Considering the damage of the connected portion due to heat, it is preferable to use a method which causes less heat influence, such as ultrasonic welding or resistance welding.

The electrode body 20 is sealed with the outer package member 30 in the following manner. First, the peripheral portions of the first and second outer package members 30A and 30B are overlapped so as to sandwich the electrode body 20 between the first and second outer package members 30A and 30B. At this time, the carbon fiber sheet 41A is inserted between the first outer package member 30A and one main surface 20A of the electrode body 20, and the carbon fiber sheet 41B is inserted between the second outer package member 30B and the other main surface 20B of the electrode body 20. Further, the adhesive film 13 and the adhesive film 13 are inserted between the positive electrode lead 11 and the outer package member 30 and between the negative electrode lead 12 and the outer package member 30, respectively. The adhesive film 13 and the adhesive film 13 may be previously attached to the positive electrode lead 11 and the negative electrode lead 12, respectively.

Then, sealing layers of the outer package members 30 which are overlapped on the periphery of the electrode body 20 are bonded by thermal fusion. As a result, the electrode body 20, the carbon fiber sheet 41A, and the carbon fiber sheet 41B are sealed with the outer package members 30, and the battery 10 is obtained. After that, the obtained battery 10 may be heat-pressed, if necessary. The first outer package member 30A and the carbon fiber sheet 41A may be bonded to each other with the thermal fusion resin layer interposed therebetween by heat-pressing, and the second outer package member 30B and the carbon fiber sheet 41B may be bonded to each other with the thermal fusion resin layer interposed therebetween by heat-pressing.

In the battery according to one embodiment, as described above, the carbon fiber sheet including the long fibers is provided between the electrode body (battery element) and the film-like outer package member, so that it is possible to improve the impact resistance of the battery and to enhance the stability of the battery with respect to external forces. Further, the carbon fiber sheet is used so that it is possible to prevent the weight of the battery from being increased as much as possible. Furthermore, a thin carbon fiber sheet is used so that it is possible to prevent the size of the battery from being increased.

Although one embodiment of the present technology have been specifically described above, the present technology is not limited to the above-mentioned one embodiment, and various modifications based on the technical idea of the present technology can be made. Hereinafter, modified examples will be described.

Figure 4:
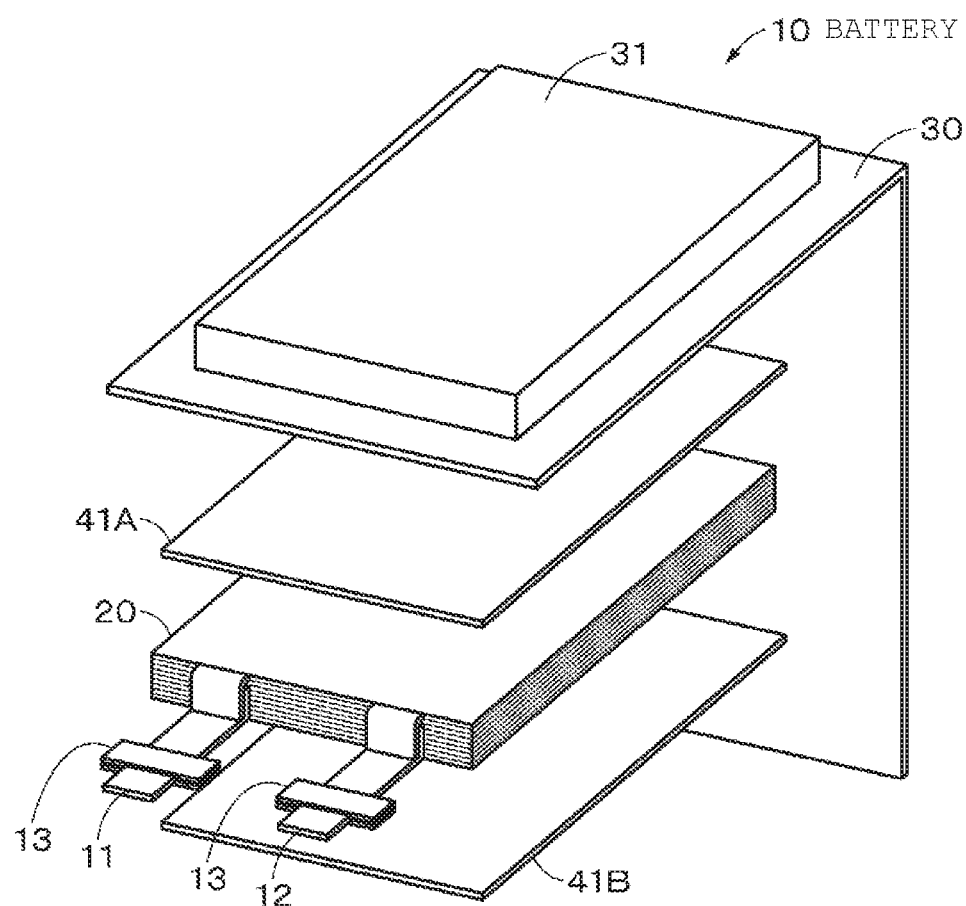
FIG. 4 is a view for explaining a modified example according to an embodiment of the present technology.

As shown in FIG. 4, the outer package member 30 may include a laminate film. The outer package member 30 has a rectangular shape and is folded back at its center portion so that the respective sides of the rectangular shape are overlapped with each other. A notch or the like may be previously provided at the folded-back border. The electrode body 20 is inserted into the folded-back outer package member 30, and the outer package member 30 is fused to the top side and the lateral side of the periphery of the electrode body 20. Further, the outer package member 30 may be fused to the bottom side. The outer package member 30 has the housing portion 31 for housing the electrode body 20 on one surface to be overlapped. The housing portion 31 is formed by deep drawing, for example.

Figure 5:
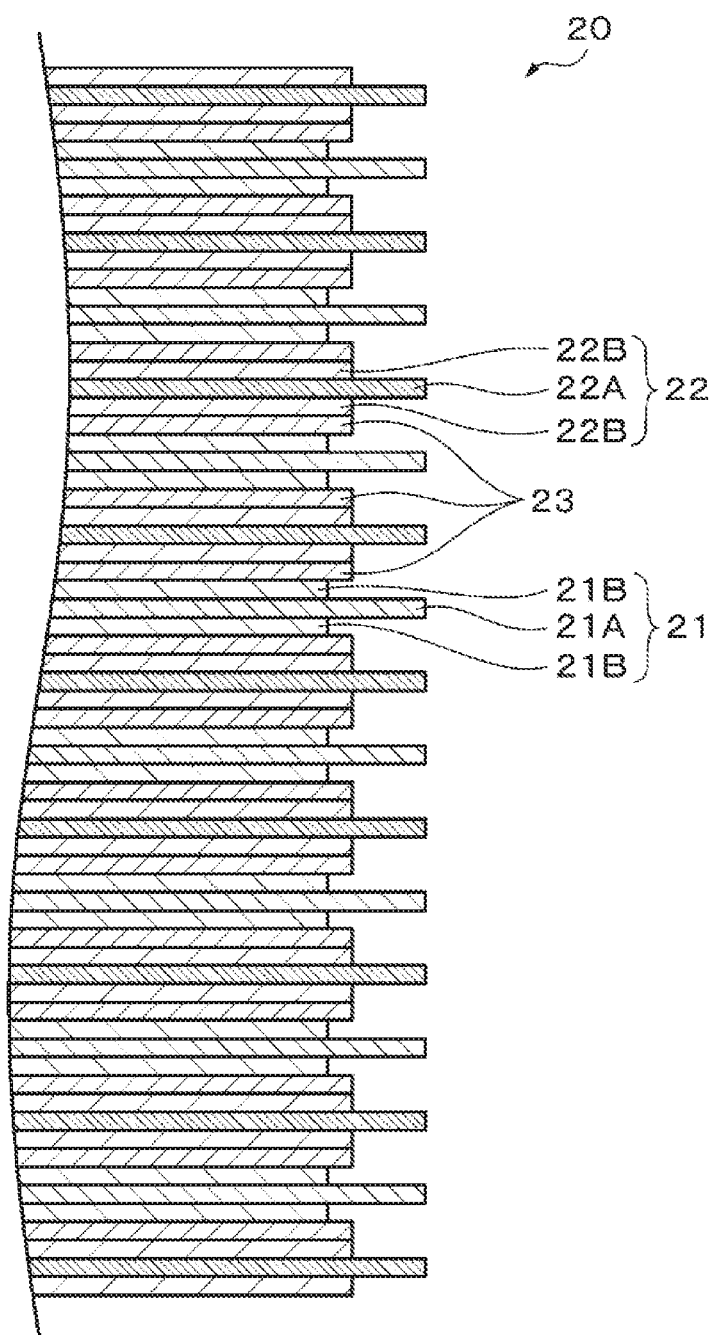
FIG. 5 is a view for explaining a modified example according to an embodiment of the present technology.

As shown in FIG. 5, the electrolyte layer 24A is not provided between the positive electrode 21 and the separator 23, and the positive electrode 21 and the separator 23 may be in direct contact with each other. Further, the electrolyte layer 24B is not provided between the negative electrode 22 and the separator 23, and the negative electrode 22 and the separator 23 may be in direct contact with each other. In this case, the positive electrode 21, the negative electrode 22, and the separator 23 contain a nonaqueous electrolytic solution. Further, solid electrolyte layers may be used as the electrolyte layers 24A and 24B.

The separator 23 may have a configuration including a base material and a surface layer provided on one side or both sides of the base material. In this case, the electrolyte layers 24A and 24B may not be provided, and a nonaqueous electrolytic solution may be used as the electrolyte.

The surface layer includes inorganic particles having electrical insulation properties and a resin material which binds the inorganic particles to the surface of the base material and binds the inorganic particles to each other. The resin material may have, for example, a three-dimensional network structure in which fibrils are formed and fibrils are continuously connected to each other. The inorganic particles are supported on the resin material having the three-dimensional network structure, so that the particles can maintain a dispersed state without being connected to each other. Further, the resin material may bind the inorganic particles to the surface of the base material or may bind the inorganic particles to each other without being fibrillated. In this case, it is possible to obtain a much higher binding ability. The surface layer is provided on one side or both sides of the base material as mentioned above, so that it is possible to impart oxidation resistance, heat resistance, and mechanical strength to the base material.

The base material is a porous layer having porosity. More specifically, the base material is a porous membrane made of an insulating film having a high ion permeability and a predetermined mechanical strength, and the electrolytic solution is held in the pores of the base material. The base material preferably has a predetermined mechanical strength as a main part of the separator, meanwhile, it is preferable that the base material needs to have characteristics such as high resistance to the electrolytic solution, low reactivity, and difficulty of expansion.

As the resin material constituting the base material, for example, a polyolefin resin such as polypropylene or polyethylene, an acrylic resin, a styrene resin, a polyester resin, a nylon resin or the like is preferably used. In particular, polyethylene such as low density polyethylene, high density polyethylene, and linear polyethylene, low molecular weight wax thereof, or a polyolefin resin such as polypropylene has an appropriate melting temperature and is easily available, and thus can be suitably used. Further, a structure obtained by laminating two or more kinds of porous membranes, or a porous membrane formed by melting and kneading two or more kinds of resin materials may be used. A separator containing a porous membrane made of a polyolefin resin has excellent separability between the positive electrode 21 and the negative electrode 22 and can further suppress the reduction in internal short circuit.

A nonwoven fabric may be used as the base material. Aramid fibers, glass fibers, polyolefin fibers, polyethylene terephthalate fibers, nylon fibers or the like can be used as the fibers constituting the nonwoven fabric. Alternatively, two or more kinds of these fibers may be mixed to form a nonwoven fabric.

The inorganic particles include at least one of a metal oxide, a metal nitride, a metal carbide, and a metal sulfide. Aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$) or the like can be suitably used as the metal oxide. Silicon nitride ($Si_3N_4$), aluminum nitride (AlN), boron nitride (BN), titanium nitride (TiN) or the like can be suitably used as the metal nitride. Silicon carbide (SiC), boron carbide (B4C) or the like can be suitably used as the metal carbide. Barium sulfate ($BaSO_4$) or the like can be suitably used as the metal sulfide. Further, porous aluminosilicate such as zeolite ($M_{2/n}O \cdot Al_2O_3 \cdot xSiO_2 \cdot yH_2O$, M is a metal element, $x \geq 2$, $y \geq 0$), layered silicate, a mineral such as barium titanate ($BaTiO_3$) or strontium titanate ($SrTiO_3$) may be used.

Among them, alumina, titania (particularly having a rutile type structure), silica or magnesia is preferably used, and alumina is more preferably used. The inorganic particles include oxidation resistance and heat resistance, and the surface layer on the side facing the positive electrode containing the inorganic particles has strong resistance to an oxidizing environment in the vicinity of the positive electrode at the time of charging. The shape of the inorganic particles is not particularly limited, and any of spherical, plate-like, fibrous, cubic, and random shapes can be used.

Examples of the resin material constituting the surface layer include fluorine-containing resins such as polyvinylidene fluoride and polytetrafluoroethylene; fluorine-containing rubbers such as a vinylidene fluoride-tetrafluoroethylene copolymer and an ethylene-tetrafluoroethylene copolymer; rubbers such as a styrene-butadiene copolymer or a hydride thereof, an acrylonitrile-butadiene copolymer or a hydride thereof, an acrylonitrile-butadiene-styrene copolymer or a hydride thereof, a methacrylic acid ester-acrylic acid ester copolymer, a styrene-acrylic acid ester copolymer, an acrylonitrile-acrylic acid ester copolymer, an ethylene propylene rubber, polyvinyl alcohol, and polyvinyl acetate; cellulose derivatives such as ethylcellulose, methylcellulose, hydroxyethylcellulose, carboxymethylcellulose; polyphenylene ether, polysulfone, polyether sulfone, polyphenylene sulfide, polyether imide, polyimide, polyamide (such as wholly aromatic polyamide (aramid)), polyamideimide, polyacrylonitrile, polyvinyl alcohol, polyether, a high heat resistant resin having at least one of a melting point and a glass transition temperature of 180° C. or higher, such as an acrylic acid resin or polyester. These resin materials may be used singly, or in combination of two or more kinds thereof. Among them, fluorine-based resins such as polyvinylidene fluoride are preferable from the viewpoint of oxidation resistance and flexibility, and aramid or polyamideimide is preferably contained from the viewpoint of heat resistance.

The particle size of the inorganic particles is preferably in a range of from 1 nm to 10 μm. In the case where the particle size is less than 1 nm, it is hard to obtain the inorganic particles, or it is not suitable in cost even in the case where the inorganic particles can be obtained. Meanwhile, in the case where the particle size is greater than 10 μm, a distance between the electrodes increases, the filling amount of an active material is not sufficiently obtained in a limited space, and the capacity of the battery 10 is decreased.

As a method of forming the surface layer, for example, the following method may be used. The surface layer is formed by applying a slurry composed of a matrix resin, a solvent, and an inorganic material to a base material (porous membrane), and allowing the coated base material to pass through a poor solvent of the matrix resin and a bath compatible with the above-described solvent, thereby causing phase separation, and then drying the resulting base material.

It should be understood that the above-mentioned inorganic particles may be contained in the porous membrane as the base material. Further, the surface layer may not contain the inorganic particles and may be made only of a resin material. In the above-mentioned one embodiment, the electrolyte layers 24A and 24B may contain the inorganic particles as fine particles.

It is preferable that the positive electrode 21 is bonded to the base material with the surface layer provided on one side of the base material interposed therebetween, and the negative electrode 22 is bonded to the base material with the surface layer provided on the other side of the base material interposed therebetween. It is preferable that a part of the polymer compound contained in the surface layer diffuses into the positive electrode active material layer 21B and the negative electrode active material layer 22B, thereby integrating the separator 23, the positive electrode 21, and the negative electrode 22. In this case, the bonding force between the positive electrode 21 and the negative electrode 22 can be increased, and occurrence of peeling between the positive electrode 21 and the negative electrode 22 can be suppressed even when the battery 10 is repeatedly bent. Therefore, it is possible to suppress deterioration of the cycle characteristics when the battery 10 is repeatedly bent.

The lead-out directions of the positive electrode lead 11 and the negative electrode lead 12 are not particularly limited. The positive electrode lead 11 and the negative electrode lead 12 may be led out in different directions. For example, the positive electrode lead 11 and the negative electrode lead 12 may be led out from different short sides, respectively. The positive electrode lead 11 and the negative electrode lead 12 may be led out from different long sides, respectively. One of the positive electrode lead 11 and the negative electrode lead 12 may be led out from the short side and the other may be led out from the long side. Further, the positive electrode lead 11 and the negative electrode lead 12 may be led out in the same direction from one long side.

In the above-mentioned one embodiment, the example in which the present technology is applied to the battery 10 having the laminate type electrode body 20 has been described, however, the structure of the battery is not particularly limited, and is not limited thereto. For example, an electrode body having a structure in which a positive electrode and a negative electrode are folded with a separator interposed therebetween may be used in place of the laminate type electrode body 20.

In the above-mentioned one embodiment, the configuration in which the electrodes include the current collectors and the active material layers has been explained as an example, however the configuration of the electrodes is not limited thereto. For example, each of the electrodes may be configured to include only the active material layer.

Figure 6:
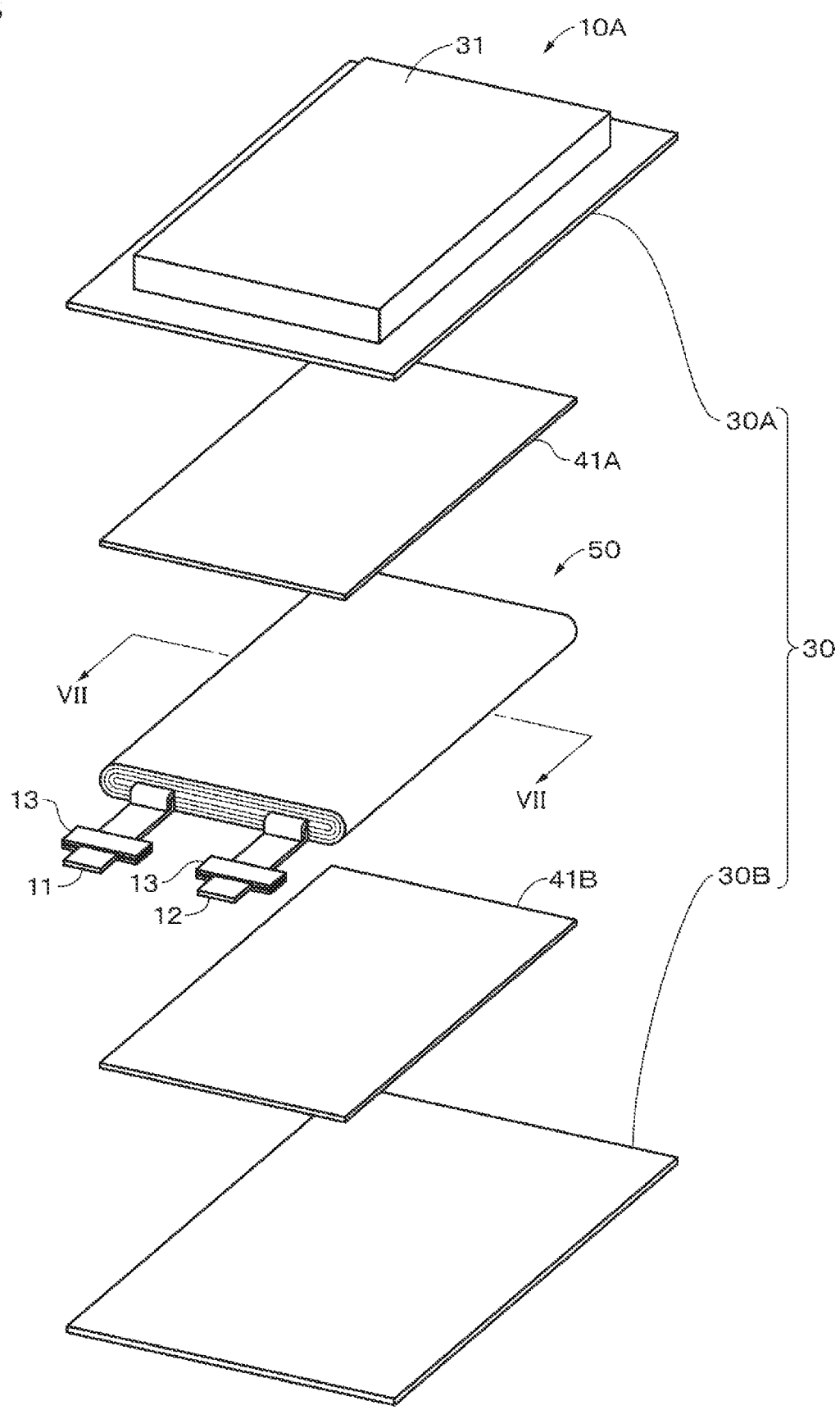
FIG. 6 is a view for explaining a modified example according to an embodiment of the present technology.

FIG. 6 is an exploded perspective view illustrating a configuration example of the battery 10A according to the modified example. The battery 10A is different from the battery 10 according to one embodiment in that a wound type electrode body 50 is provided in place of the laminate type electrode body 20. The same parts are denoted by the same reference numerals, and the description thereof is omitted.

Figure 7:
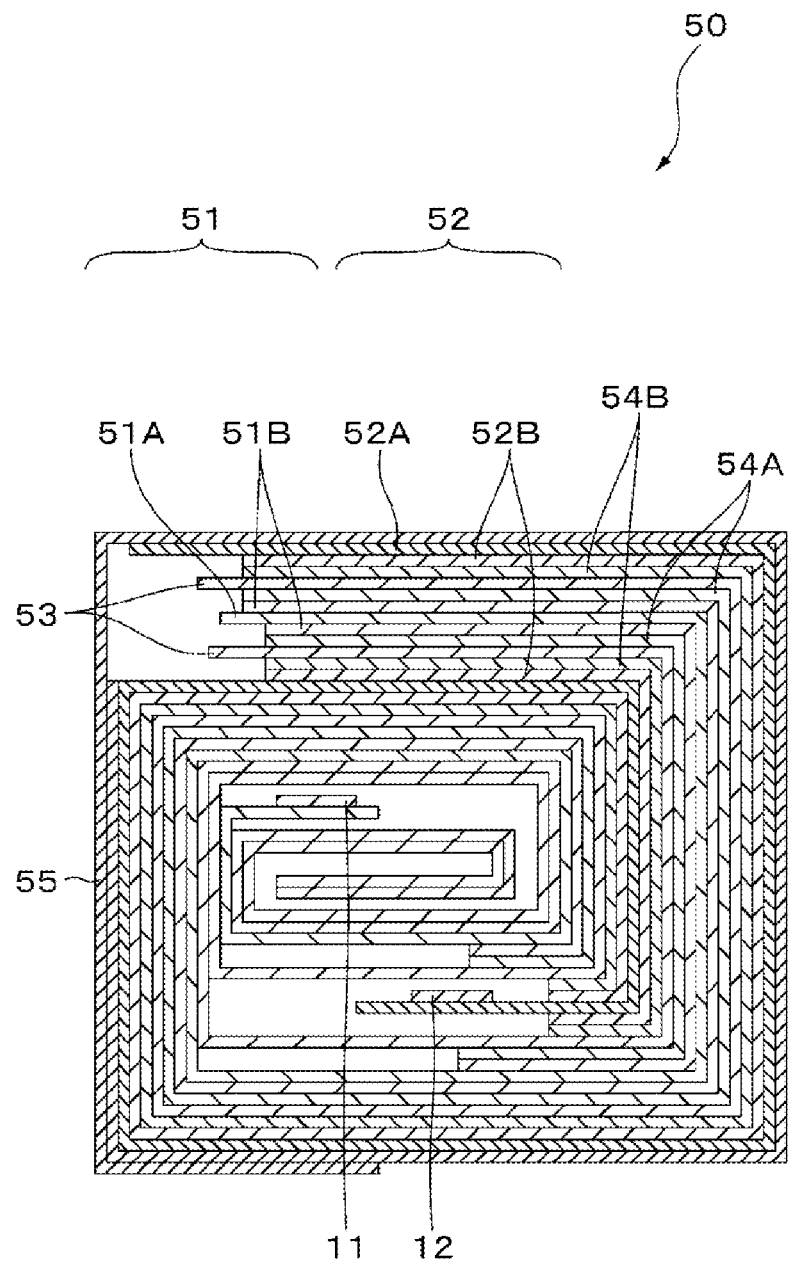
FIG. 7 is a view for explaining a modified example according to an embodiment of the present technology.

FIG. 7 is a cross-sectional view of the wound type electrode body 50 along the line VII-VII shown in FIG. 6. The wound type electrode body 50 is formed by laminating a positive electrode 51, including a positive electrode active material layer 51B, and a negative electrode 52, including a negative electrode active material layer 52B, with a separator 53, an electrolyte layer 54A, and an electrolyte layer 54B interposed therebetween and winding the laminated body, and the outermost peripheral portion is protected by a protective tape 55. The electrolyte layer 54A is provided between the positive electrode 51 and the separator 53, and the electrolyte layer 54B is provided between the negative electrode 52 and the separator 53.

Subsequently, an example of a method of producing the battery 10A will be described.

First, a precursor solution containing a solvent, an electrolyte salt, a polymer compound, and a mixed solubilizing agent is applied to each of the positive electrode 51 and the negative electrode 52, and the mixed solubilizing agent is volatilized to form the electrolyte layers 54A and 54B. Next, the positive electrode lead 11 is attached to an end of a positive electrode current collector 51A by welding or the like, and the negative electrode lead 12 is attached to an end of a negative electrode current collector 52A by welding or the like. Then, the positive electrode 51 having the electrolyte layer 54A and the negative electrode 52 having the electrolyte layer 54B are laminated with the separator 53 interposed therebetween to form a laminated body, the laminated body is wound in the longitudinal direction thereof, and the protective tape 55 is attached to the outermost peripheral portion to form the wound type electrode body 50. Finally, for example, the wound type electrode body 50, the carbon fiber sheet 41A, and the carbon fiber sheet 41B are sandwiched between the first outer package member 30A and the second outer package member 30B, and outer edges of the first and second outer package members 30A and 30B are closely contacted by thermal fusion or the like to enclose the wound type electrode body 50. At that time, the adhesive film 13 is inserted between each of the positive electrode lead 11 and the negative electrode lead 12 and each of the first outer package member 30A and the second outer package member 30B. Thus, the battery 10A shown in FIGS. 6 and 7 is obtained.

Further, the battery 10A may be produced in the following manner. First, the positive electrode 51 and the negative electrode 52 are produced in the above manner, and the positive electrode lead 11 and the negative electrode lead 12 are attached to the positive electrode 51 and the negative electrode 52, respectively. Next, the positive electrode 51 and the negative electrode 52 are laminated with the separator 53 interposed therebetween and the laminated body is wound, and the protective tape 55 is attached to the outermost peripheral portion to form the wound type electrode body 50. Then, the wound type electrode body 50, the carbon fiber sheet 41A, and the carbon fiber sheet 41B are sandwiched between the first outer package member 30A and the second outer package member 30B, outer peripheral portions excluding one side are thermally fused to be formed into a bag shape, and the bag-shaped body is housed in the first and second outer package members 30A and 30B. After that, a composition for electrolyte containing a solvent, an electrolyte salt, a monomer as a raw material for a polymer compound, a polymerization initiator, and, if necessary, other materials such as a polymerization inhibitor is provided, and the composition is injected into the first and second outer package members 30A and 30B.

After injecting the composition for electrolyte into the first and second outer package members 30A and 30B, a cavity of the first and second outer package members 30A and 30B is thermally fused and sealed in a vacuum atmosphere. Then, the monomer is polymerized by heating so as to form a polymer compound, thereby forming the gel electrolyte layers 54A and 54B. Thus, the battery 10A shown in FIGS. 6 and 7 is obtained.

In the above-mentioned one embodiment, one carbon fiber sheet is provided between the first outer package member 30A and the main surface 20A of the electrode body 20, however, two or more carbon fiber sheets may be provided between the first outer package member 30A and the main surface 20A of the electrode body 20.

In this case, arrangement directions of the long fibers included in each of the two or more carbon fiber sheets may be different. For example, two carbon fiber sheets may be provided between the first outer package member 30A and the main surface 20A of the electrode body 20 so that the arrangement directions of the long fibers included in the carbon fiber sheets are substantially perpendicular to each other. The same applies to the carbon fiber sheet provided between the second outer package member 30B and the main surface 20B of the electrode body 20.

Figure 8A:
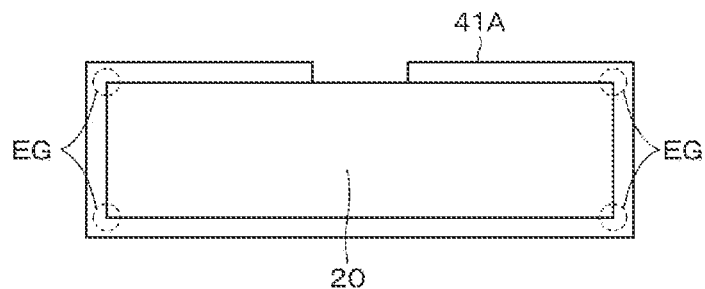
FIGS. 8A to 8D are views for explaining modified examples according to an embodiment of the present technology.
Figure 8B:
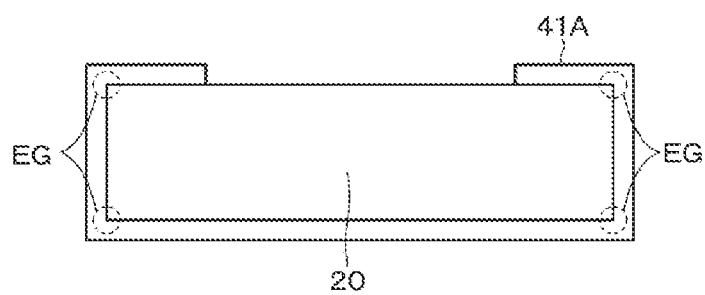
Figure 8C:
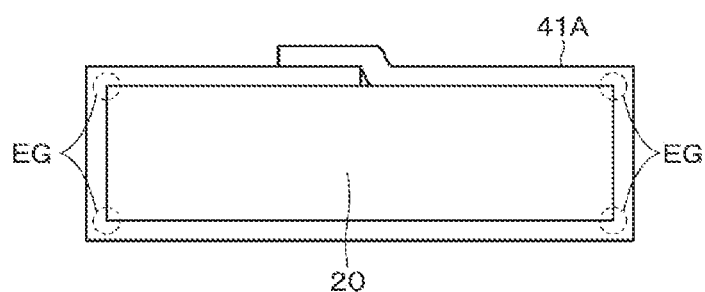
Figure 8D:
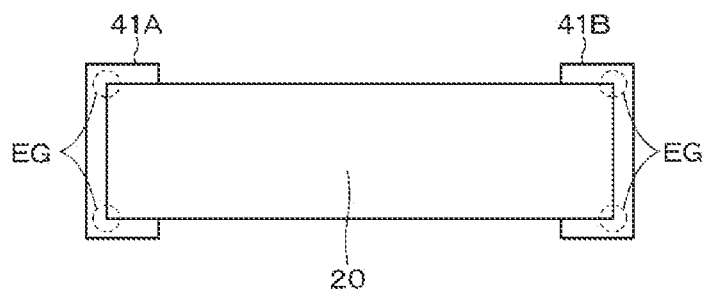

The battery 10 according to the above-mentioned one embodiment may include either the carbon fiber sheet 41A or the carbon fiber sheet 41B. For example, the battery 10 may include one carbon fiber sheet 41A. As shown in FIGS. 8A and 8B, the carbon fiber sheet 41A may be wrapped around (the periphery surface of) the electrode body 20 so as to form a U-shaped cross section. In this case, edges EG which are likely to be short-circuited due to damage caused by deformation by external forces are preferably covered with the carbon fiber sheet 41A. Further, as shown in FIG. 8C, the carbon fiber sheet 41A may be wrapped around the electrode body 20 one or more times. However, in order to prevent the volume of the battery 10 from being unnecessarily increased, the upper limit of the covering ratio of the carbon fiber sheet 41A to the entire surface of the electrode body 20 is preferably 110% or less as described in one embodiment. Further, as shown in FIG. 8D, for example, two carbon fiber sheets 41A and 41B having a U-shaped cross section may be used to cover the edges EG of the electrode body 20.

When the shape of the electrode body 20 in a top view is other than a rectangle, the length of the long fibers may be defined based on a portion different from the short side direction. For example, when the shape of the electrode body 20 in a top view is a circle, the length of the long fibers may be defined based on the diameter and radius of the circle, when the shape of the electrode body 20 in a top view is an ellipse, the length of the long fibers may be defined based on the short diameter of the ellipse or the like, and when the shape of the electrode body 20 in a top view is a polygon, the length of the long fibers may be defined based on the length of an arbitrary side of the polygon.

In the above-mentioned one embodiment, the carbon fiber sheets 41A and 41B are provided on the insides of the outer package members 30, however, the carbon fiber sheets 41A and 41B may be provided on the outsides of the outer package members 30. For example, the carbon fiber sheets 41A and 41B may be attached to the outsides of the outer package members 30 with a bonding layer (such as a double-sided sheet or an adhesive) interposed therebetween. However, since the volume of the battery 10 is increased by the amount of the bonding layer, the carbon fiber sheets 41A and 41B are preferably provided on the insides of the outer package members 30.

The configurations, methods, steps (production processes), shapes, materials, and numerical values in the above-mentioned one embodiment are merely examples, and configurations, methods, steps (production processes), shapes, materials, and numerical values, each of which is different from those in the above-mentioned one embodiment, may be used, if necessary. Further, the above-mentioned one embodiment may be combined with the Modified Examples. The present technology can also be applied to secondary batteries other than lithium ion secondary batteries (the battery structure may have a cylindrical type, a coin type, a rectangular type, a button type, or the like.) or primary batteries.

EXAMPLES

Subsequently, Examples of the present technology will be described, but the present technology is not limited to the following Examples.

Example 1

97 mass % of $LiNi_{0.82}Co_{0.15}Al_{0.03}O_2$ as a positive electrode active material, 1 mass % of carbon black as a conductive agent, and 2 mass % of polyvinylidene fluoride (PVdF) as a binding agent were mixed to prepare a positive electrode mixture, and the positive electrode mixture was dispersed in N-methyl-2-pyrrolidone (NMP) as a dispersion medium to form a positive electrode mixture slurry. The positive electrode mixture slurry was applied to both sides of a positive electrode current collector made of a band-like aluminum foil having a thickness of 12 μm so that a part of the positive electrode current collector was exposed. Thereafter, the dispersion medium of the applied positive electrode mixture slurry was evaporated and dried, and the resulting product was compression-molded by a roll press machine to form a positive electrode active material layer. Finally, a positive electrode terminal was attached to a positive electrode current collector exposed portion, and thus a positive electrode was formed.

90 mass % of granular graphite powder having an average particle size of 20 μm as a negative electrode active material, 5 mass % of SiO, 1.5 mass % of an acrylic acid modified product of a styrene-butadiene copolymer as a binding agent, 2 mass % of polyvinylidene fluoride (PVdF) fine particles having a particle size of 0.3 μm, and 1.5 mass % of carboxymethylcellulose as a thickener were mixed to form a negative electrode mixture, and an appropriate amount of water was further added thereto and stirred to prepare a negative electrode mixture slurry. The negative electrode mixture slurry was applied to both sides of a negative electrode current collector made of a band-like copper foil having a thickness of 15 μm so that a part of the negative electrode current collector was exposed. Thereafter, the dispersion medium of the applied negative electrode mixture slurry was evaporated and dried, and the resulting product was compression-molded by a roll press machine to form a negative electrode active material layer. Finally, a negative electrode terminal was attached to a negative electrode current collector exposed portion, and thus a negative electrode was formed.

Lithium hexafluorophosphate ($LiPF_6$) as an electrolyte salt was dissolved at a concentration of 1 mol/$dm_3$ in a nonaqueous solvent prepared by mixing ethylene carbonate (EC), methyl ethyl carbonate (MEC), and vinylene carbonate (VC) at a mass ratio of 30:69:0.5:0.5, thereby preparing a nonaqueous electrolytic solution.

An N-methylpyrrolidone solution containing PVdF and alumina in a weight ratio of 2:1 was applied to a separator containing polyethylene and polypropylene and having a thickness of 12 microns, and the resulting separator was immersed in a water bath so as to cause phase-separation of the PVdF solution and further subjected to hot air drying.

Subsequently, the carbon fiber sheet, knitted with carbon fibers having a fiber diameter of 7 micron meters and a total thickness of about 40 micron meters, are provided on the both main surfaces of the electrode body, which is obtained by sequentially laminating the positive electrode, the separator, the negative electrode (in which PVdF layers were formed on both sides) and the separator, as shown in FIG. 1.

The thickness of the carbon fiber sheet was measured using the following device:
Manufacturer name: Mitutoyo Corporation
Model number: 227-201
Contact pressure: 5 N Then, the laminated electrode body was sheathed with a laminate film having a soft aluminum layer, and the lead-out sides of the positive electrode terminal and the negative electrode terminal around the laminated electrode body and the other three sides were thermally fused to seal the electrode body. After that, the cell shape was reconstructed by pressing.

As a result, a laminate film type battery having a thickness of 46 mm, a width of 64 mm, a height of 88 mm (466488 size), and a capacity of 3600 mAh was produced. The weight of the battery is 60.7 g.

The cell was charged at a constant current of 720 mA and a constant voltage of 4.2 V in a constant temperature bath at 23° C., and charging was terminated when the charging current decreased to 100 mA.

After pausing for 30 minutes, discharging was performed at a constant current of 720 mA, discharging was terminated when the battery voltage reached 2.5 V, and then the initial capacity was determined. The obtained results are shown in Table 1.

The cell was charged at a constant current of 720 mA and a constant voltage of 4.25 V in a constant temperature bath at 23° C., and charging was terminated when the charging current decreased to 100 mA. A test was conducted to examine the stability of the battery against external forces in the following manner.

While measuring the temperature of the battery, a 15.8 mm-round bar was placed almost at the center of the battery so as to be in parallel with the electrode surface of the battery and to be perpendicular to the direction of the upper terminal of the battery, and then a 9.1 kg heavy load was dropped on the round rod from a height of 61 cm.

Table 1 shows the temperature of the battery after 5 minutes after starting the test.

Example 2

A battery was produced in the same manner as in Example 1. However, unlike Example 1, a carbon fiber sheet having a thickness of 100 microns was used. Then, the weight, initial capacity, and stability of the battery were tested in the same manner as in Example 1. The obtained results are shown in Table 1.

Example 3

A battery was produced in the same manner as in Example 1. However, unlike Example 1, the battery was produced in which a carbon fiber sheet having a thickness of 40 microns was wrapped around an electrode body once. Then, the weight, initial capacity, and stability of the battery were tested in the same manner as in Example 1. The obtained results are shown in Table 1.

Comparative Example 1

A battery was produced in the same manner as in Example 1. However, unlike Example 1, the battery not including the carbon fiber sheet was produced. Then, the weight, initial capacity, and stability of the battery were tested in the same manner as in Example 1. The obtained results are shown in Table 1.

Comparative Example 2

A battery was produced in the same manner as in Example 1. However, unlike Example 1, the battery was produced using a copper foil (Cu foil) having a thickness of 20 microns in place of the carbon fiber sheet. Then, the weight, initial capacity, and stability of the battery were tested in the same manner as in Example 1. The obtained results are shown in Table 1.

Comparative Example 3

A battery was produced in the same manner as in Example 1. However, unlike Example 1, the battery was produced using a copper plate (Cu plate) having a thickness of 1 mm in place of the carbon fiber sheet. Then, the weight, initial capacity, and stability of the battery were tested in the same manner as in Example 1. The obtained results are shown in Table 1.

Comparative Example 4

A battery was produced in the same manner as in Example 1. However, unlike Example 1, the battery was produced using a polyimide film. Then, the weight, initial capacity, and stability of the battery were tested in the same manner as in Example 1. The obtained results are shown in Table 1.

Comparative Example 5

A battery was produced in the same manner as in Example 1. However, unlike Example 1, the battery was produced using a polycarbonate film in place of the carbon fiber sheet. Then, the weight, initial capacity, and stability of the battery were tested in the same manner as in Example 1.
The obtained results are shown in Table 1.

Comparative Example 6

A battery was produced in the same manner as in Example 1. However, unlike Example 1, the battery was produced using a polyphenylene sulfide film in place of the carbon fiber sheet. Then, the weight, initial capacity, and stability of the battery were tested in the same manner as in Example 1. The obtained results are shown in Table 1.

Electrode tabs were welded to the positive electrode and the negative electrode produced in the same manner as in Example 1, and separators and the electrode tabs were wound to form an electrode body. A carbon fiber sheet knitted with carbon fibers (having a total thickness of about 40 microns and a fiber diameter of 7 microns) was provided on the wound body as shown in FIG. 6.

Then, the electrode body was sheathed with a laminate film having a soft aluminum layer, and the lead-out sides of the positive electrode terminal and the negative electrode terminal around the electrode body and the other three sides were thermally fused to seal the electrode body. After that, the cell shape was reconstructed by pressing.

As a result, a laminate film type battery having a thickness of 46 mm, a width of 64 mm, a height of 88 mm (466488 size), and a capacity of 3600 mAh was produced. The weight of the battery is 60.7 g.

Example 4

A battery was produced in the same manner as in Example 1. However, unlike Example 1, the battery was produced in which carbon fiber sheets were laminated on a wound element (electrode body). The weight, initial capacity, and stability of the battery were tested in the same manner as in Example 1. The obtained results are shown in Table 1.

Comparative Example 7

A battery was produced in the same manner as in Example 4. However, unlike Example 4, the battery not including the carbon fiber sheet was produced. Then, the weight, initial capacity, and stability of the battery were tested in the same manner as in Example 1. The obtained results are shown in Table 1.

TABLE 1

|  | Shape of the element | Sheet | Battery weight (g) | Initial capacity (mAh) | Battery temperature after the stability test (° C.) |
|---|---|---|---|---|---|
| Example 1 | Laminated | Carbon fiber sheet (thickness 40 μm) | 60.69 | 3480 | 25 |
| Example 2 | Laminated | Carbon fiber sheet (thickness 100 μm) | 62.18 | 3480 | 25 |
| Example 3 | Laminated | Carbon fiber sheet (thickness 40 μm, wrapped around once) | 60.83 | 3481 | 25 |
| Example 4 | Wound | Carbon fiber sheet (Wound) | 60.69 | 3476 | 25 |
| Comparative Example 1 | Laminated | No carbon fiber sheet | 59.70 | 3484 | 250 |
| Comparative Example 2 | Laminated | Cu foil (thickness 20 μm) | 61.71 | 3483 | 249 |
| Comparative Example 3 | Laminated | Cu plate (thickness 1 mm) | 69.77 | 3479 | 25 |
| Comparative Example 4 | Laminated | Polyimide film | 60.50 | 3482 | 250 |
| Comparative Example 5 | Laminated | Polycarbonate film | 60.50 | 3482 | 249 |
| Comparative Example 6 | Laminated | Polyphenylene sulfide film | 60.50 | 3481 | 248 |
| Comparative Example 7 | Wound | No carbon fiber sheet | 59.70 | 3479 | 250 |

In Examples 1 to 3, it was confirmed that the weight of the battery was maintained to be light without unnecessarily increasing the weight of the battery. Further, it was confirmed that a short circuit in the battery did not occur due to external forces, and the battery temperature after the stability test was also stable. Furthermore, in Example 4, it was confirmed that the same effect as in Example 1 could be obtained even when the element was formed into a wound shape.

Meanwhile, in Comparative Example 1, it was confirmed that the battery was lightweight because the carbon fiber sheet was not used, but the stability against external forces applied to the battery was poor. Since the protection against external forces applied to the battery is insufficient, the battery is largely deformed due to the applied external forces. It is considered that the battery deformation caused damage to the positive electrode and the negative electrode and a short circuit occurred, and thus the stability was deteriorated (the battery temperature was increased).

In Comparative Example 2, it was confirmed that the battery was lightweight, but the stability against external forces applied to the battery was poor. This is considered because although the Cu foil of about 20 microns is lightweight, its strength is insufficient, so the battery deformation is large when external forces are applied, and this causes damage to the positive electrode and the negative electrode and a short circuit occurs, and thus the stability is deteriorated.

In Comparative Example 3, it was confirmed that the battery exhibited high stability against external forces applied to the battery, but the weight of the battery was increased. It was confirmed that the Cu plate having a thickness of about 1 mm exhibited high stability against external forces, but the weight of the battery was extremely heavy and this was not suitable for practical use.

In Comparative Example 4, it was confirmed that although the battery was lightweight, the stability against external forces applied to the battery was poor. It is considered because although the polyimide film has a high strength, its elongation is large, so the battery deformation is large when external forces are applied, and this causes damage to the positive electrode and the negative electrode and a short circuit occurs, and thus the stability is deteriorated.

In Comparative Example 5, it was confirmed that although the battery was lightweight, the stability against external forces applied to the battery was poor. Although the polycarbonate film has a high strength, since the elongation is large, deformation of the battery when an external force is applied is large, causing damage of the positive electrode and the negative electrode, and it is considered that the stability is impaired because a short circuit occurs.

In Comparative Example 6, it was confirmed that although the battery was lightweight, the stability against external forces applied to the battery was poor. It is considered because although the polyphenylene sulfide film has a high strength, its elongation is large, so the battery deformation is large when external forces are applied, and this causes damage to the positive electrode and the negative electrode and a short circuit occurs, and thus the stability is deteriorated.

In Comparative Example 7, it was confirmed that the battery was lightweight because the carbon fiber sheet was not used, but the stability against external forces applied to the battery was poor. Since the protection against external forces applied to the battery is insufficient, the battery is largely deformed due to the applied external forces. It is considered that the battery deformation caused damage to the positive electrode and the negative electrode and a short circuit occurred, and thus the stability was deteriorated (the battery temperature was increased).

Subsequently, Application Examples of the present technology will be described. However, the present technology is not limited to the following Application Examples.

Figure 9:
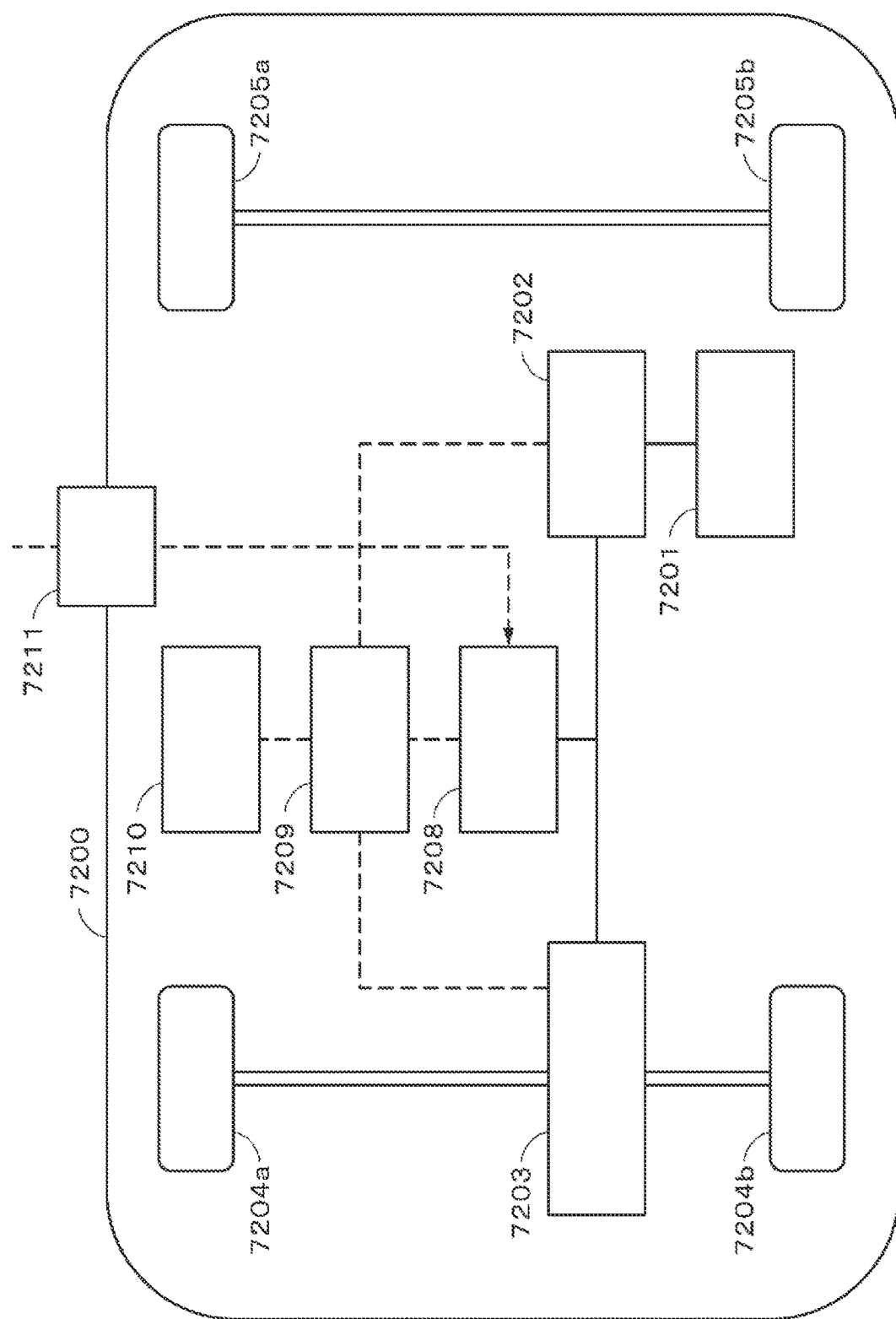
FIG. 9 is a view for explaining an application example according to an embodiment of the present technology.

An example in which the present technology is applied to a power storage system for a vehicle will be described with reference to FIG. 9. FIG. 9 schematically illustrates an example of a configuration of a hybrid vehicle employing a series hybrid system to which the present technology is applied. The series hybrid system is a car that runs with an electric power driving force converting device by using electric power generated by a power generator driven by an engine or electric power once stored in a battery.

In a hybrid vehicle 7200, an engine 7201, a power generator 7202, an electric power driving force converting device 7203, a driving wheel 7204a, a driving wheel 7204b, a wheel 7205a, a wheel 7205b, a battery 7208, a vehicle control device 7209, various sensors 7210, and a charging port 7211 are mounted. The battery according to the above-mentioned one embodiment of the present technology is applied to the battery 7208.

The hybrid vehicle 7200 runs by using the electric power driving force converting device 7203 (converter) as a power source. An example of the electric power driving force converting device 7203 is a motor. The electric power driving force converting device 7203 is operated by the electric power of the battery 7208 and a rotational force of the electric power driving force converting device 7203 is transmitted to the driving wheels 7204a and 7204b. Direct current-alternating current (DC-AC) conversion or reverse conversion (AC-DC conversion) is used for the necessary portion, whereby the electric power driving force converting device 7203 can be applied to either an AC motor or a DC motor. The various sensors 7210 control the rotation speed of the engine via the vehicle control device 7209 and control the opening (throttle opening) of a throttle valve (not shown). The various sensors 7210 include a speed sensor, an acceleration sensor, an engine speed sensor, and the like.

The rotational force of the engine 7201 is transmitted to the power generator 7202, and the electric power generated by the power generator 7202 through the rotational force can be accumulated in the battery 7208.

When the hybrid vehicle decelerates by a braking mechanism (not shown), the resistance force at the time of deceleration is applied to the electric power driving force converting device 7203 as a rotational force, and the regenerative electric power generated by the electric power driving force converting device 7203 through the rotational force is accumulated in the battery 7208.

The battery 7208 is connected to a power supply outside the hybrid vehicle so that it is possible to receive supply of electric power from the external power supply by using the charging port 7211 as an input port and to thereby accumulate the received electric power.

Although not shown, the hybrid vehicle may include an information processing device (controller including a processor) that performs information processing relating to vehicle control based on information on the secondary battery. As such an information processing device, for example, there is an information processing device for displaying the remaining battery capacity based on information on the remaining capacity of the battery.

The above is an example of the series hybrid car that runs with a motor by using the electric power generated by a power generator driven by an engine or the electric power once stored in the battery. However, the present technology can be effectively applied to a parallel hybrid car which employs both outputs of engine and motor as the drive source, and uses, with appropriate switching, three systems, running by only the engine, running by only the motor, and running by the engine and the motor. Furthermore, the present technology can be effectively applied to a so-called electric vehicle which does not use an engine and runs by driving by only a driving motor.

An example of the hybrid vehicle 7200 to which the technology according to the present technology can be applied has been described above. The technology according to the present technology can be suitably applied to, for example, the battery 7208 among the above-described configurations. Specifically, the battery according to one embodiment is applied to the battery 7208.

Figure 10:
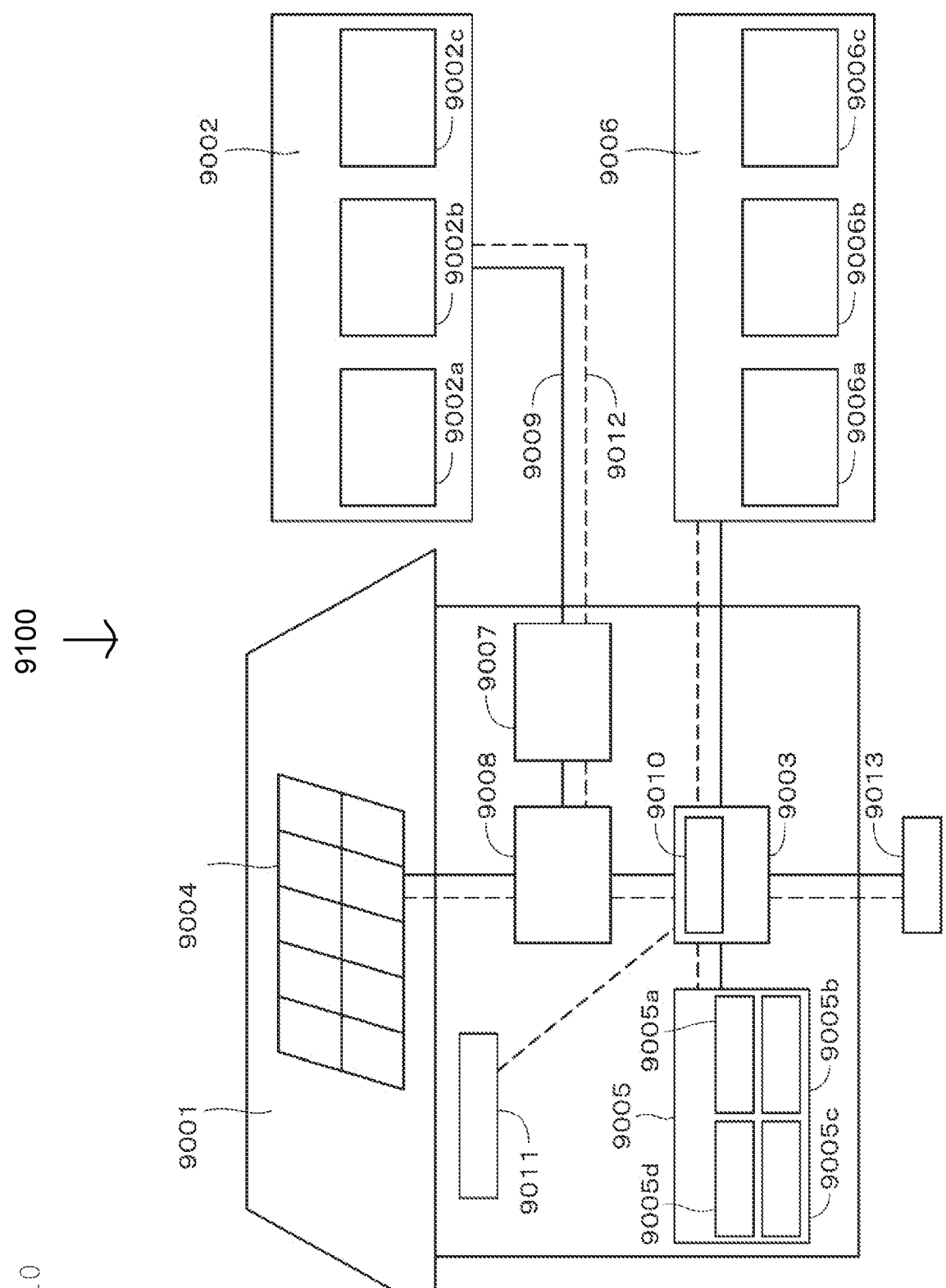
FIG. 10 is a view for explaining an application example according to an embodiment of the present technology.

An example in which the present technology is applied to a power storage system for a house will be described with reference to FIG. 10. For example, in a power storage system 9100 for a house 9001, electric power is supplied from a centralized power system 9002 such as a thermal power generation 9002a, a nuclear power generation 9002b or a hydraulic power generation 9002c to a power storage device 9003 via a power network 9009, an information network 9012, a smart meter 9007, a power hub 9008, and the like. With this, electric power is supplied from an independent power supply such as a domestic power generation device 9004 to the power storage device 9003. The electric power supplied to the power storage device 9003 is stored. Electric power to be used in the house 9001 is supplied using the power storage device 9003. A similar power storage system can be used not only for the house 9001 but also for a building.

The house 9001 is provided with the domestic power generation device 9004, a power consumption device 9005, the power storage device 9003, a control device 9010 (controller) for controlling the devices, the smart meter 9007, and a sensor 9011 for acquiring various kinds of information. Each of the devices is connected by the power network 9009 and the information network 9012. A solar cell, a fuel cell, or the like is used as the power generation device 9004, and the generated electric power is supplied to the power consumption device 9005 and/or the power storage device 9003. The power consumption device 9005 is a refrigerator 9005a, an air conditioner 9005b, a television receiver 9005c, a bath 9005d, or the like. Furthermore, the power consumption device 9005 includes an electric vehicle 9006. The electric vehicle 9006 is an electric car 9006a, a hybrid car 9006b, an electric motorcycle 9006c, or the like.

The battery according to the above-mentioned one embodiment of the present technology is applied to the power storage device 9003. The smart meter 9007 includes a function of measuring the use amount of commercial electric power and sending the use amount measured to an electric power company. The power network 9009 may be any one or combination of DC power feed, AC power feed, and non-contact power feed.

The various sensors 9011 include, for example, a human sensor, an illuminance sensor, an object detection sensor, a power consumption sensor, a vibration sensor, a contact sensor, a temperature sensor, and an infrared sensor. Information acquired by the various sensors 9011 is transmitted to the control device 9010. Based on the information from the sensors 9011, the state of weather, the state of person, and the like are grasped and the power consumption device 9005 can be automatically controlled to minimize energy consumption. Further, the control device 9010 can transmit information on the house 9001 to an external electric power company or the like via the Internet.

The power hub 9008 performs processes such as branching of power lines and DC/AC conversion. As a communication method of the information network 9012 connected to the control device 9010, a method of using a communication interface such as a Universal Asynchronous Receiver-Transmitter: transmission/reception circuit for asynchronous serial communication (UART) and a method of using a sensor network in accordance with a wireless communication standard, such as Bluetooth (registered trademark), ZigBee or Wi-Fi, can be utilized. The Bluetooth system is applied to multimedia communication and can perform one-to-many connection communication. ZigBee uses the physical layer of IEEE (Institute of Electrical and Electronics Engineers) 802.15.4. IEEE 802.15.4 is a name of a short range wireless network standard called PAN (Personal Area Network) or W (Wireless) PAN.

The control device 9010 is connected to an external server 9013. This server 9013 may be managed by any of the house 9001, the electric power company, and a service provider. The information transmitted and received by the server 9013 is, for example, power consumption information, life pattern information, a power fee, weather information, natural disaster information, and power trade information. This information may be transmitted and received from a power consumption device (e.g., a television receiver) in the home, but it may be transmitted and received from a device outside the home (e.g., a mobile phone). This information may be displayed on a device having a display function such as a television receiver, a mobile phone, a personal digital assistant (PDA) or the like.

The control device 9010 that controls each unit includes a Central Processing Unit (CPU) or a processor, a Random Access Memory (RAM), and a Read Only Memory (ROM), and is housed in the power storage device 9003 in this example. The control device 9010 is connected to the power storage device 9003, the power generation device 9004, such as a domestic power generation device, the power consumption device 9005, the various sensors 9011, the server 9013, and the information network 9012. The control device 9010 has, for example, a function of adjusting the use amount of commercial electric power and the amount of power generation. The control device 9010 may include a function of performing electric power transaction in an electric power market. The control device 9010 may control supply of an electric power from the battery to an electric device.

As described above, not only electric power generated by the centralized power system 9002 (such as the thermal power generation 9002a, the nuclear power generation 9002b or the hydraulic power generation 9002c), but also electric power generated by the power generation device 9004 (solar power generation, wind power generation) can be stored in the power storage device 9003.

Therefore, even if the electric power generated by the power generation device 9004 varies, it is possible to perform control such that the amount of electric power sent to the outside is made constant or is discharged as necessary. For example, electric power obtained by solar power generation is stored in the power storage device 9003, low-cost late-night electric power is stored in the power storage device 9003 in the night, and the electric power stored by the power storage device 9003 is discharged and utilized in a high-cost time zone in the daytime.

Although the example in which the control device 9010 is stored in the power storage device 9003 has been described, the control device 9010 may be stored in the smart meter 9007 or may be configured independently. Further, the power storage system 9100 may be used for a plurality of homes in collective housing, or may be used for a plurality of single-family houses.

An example of the power storage system 9100 to which the technology according to the present technology can be applied has been described above. The technology according to the present technology can be suitably applied to the power storage device 9003 among the above-described configurations. Specifically, the battery according to one embodiment can be applied to the power storage device 9003.

The present technology can be applied not only to large electric vehicles and airplanes, but also to electric motorcycles, electric bicycles, electric tricycles, and electric small aircrafts (also called drones). Further, the present technology can be applied to electronic devices (such as PCs, smart phones, mobile phones, power tools, and toys) in which secondary batteries can be used, and the present technology can be realized as an electronic device that receives supply of electric power from the above-mentioned battery or an electronic device having the above-mentioned battery.

The present technology is described below in further detail according to an embodiment.

(1) A battery including: a battery element; a film-like outer package member which houses the battery element; and a carbon fiber sheet which is provided between the battery element and the film-like outer package member and includes long fibers.
(2) The battery according to (1), where the carbon fiber sheet is a woven fabric or a nonwoven fabric of long fibers.
(3) The battery according to (1) or (2), where the long fibers constitute a bundle.
(4) The battery according to any one of (1) to (3), where the long fibers are arranged in at least two directions.
(5) The battery according to (4), where the long fibers are arranged in a direction substantially perpendicular to each other.
(6) The battery according to any one of (1) to (5), where two or more of the carbon fiber sheets are provided between the battery element and the film-like outer package member.
(7) The battery according to (6), where arrangement directions of the long fibers included in each of the two or more carbon fiber sheets are different.
(8) The battery according to any one of (1) to (7), where the battery element has a flat shape or a rectangular shape, and the carbon fiber sheet is provided between each of main surfaces of the battery element and the film-like outer package member.
(9) The battery according to any one of (1) to (8), where the covering ratio of the carbon fiber sheet to the entire surface of the battery element is 70% or more and 110% or less.
(10) The battery according to any one of (1) to (8), where the carbon fiber sheet is wrapped around the battery element one or more times.
(11) The battery according to any one of (1) to (10), where the battery element has a laminated structure or a wound structure.
(12) The battery according to any one of (1) to (11), where the carbon fiber sheet does not contain a binder.
(13) The battery according to any one of (1) to (12), where an average thickness of the carbon fiber sheet is 20 μm or more and 200 μm or less.
(14) An electronic device including the battery according to (1).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising:
    a battery element having a main surface having substantially rectangular shape in a top view;
    a film-like outer package member configured to accommodate the battery element; and
    a carbon fiber sheet provided between the main surface of the battery element and the film-like outer package member,
    wherein the carbon fiber sheet includes long fibers
    wherein the long fibers are carbon fibers having a length of 50% to 120% with respect to a length of a side portion of the main surface.
2. The battery according to claim 1, wherein the long fibers form a bundle.
3. The battery according to claim 1, wherein the long fibers are provided as a woven fabric or a nonwoven fabric.
4. The battery according to claim 1, wherein a covering ratio of the carbon fiber sheet to an entire surface of the battery element is 70% or more and 110% or less.
5. The battery according to claim 1, wherein the carbon fiber sheet is wrapped around the battery element.
6. The battery according to claim 1, wherein the battery element has a laminated structure or a wound structure.
7. The battery according to claim 1, wherein the carbon fiber sheet does not include a binder.
8. The battery according to claim 1, wherein an average thickness of the carbon fiber sheet is 20 μm or more and 200 μm or less.
9. The battery according to claim 1, wherein the long fibers are arranged in at least two directions.
10. The battery according to claim 9, wherein the long fibers are arranged in directions substantially perpendicular to each other.
11. The battery according to claim 1, wherein the carbon fiber sheet includes two or more of the carbon fiber sheets provided between the battery element and the film-like outer package member.
12. The battery according to claim 11, wherein arrangement directions of the long fibers in each of the two or more carbon fiber sheets are different.
13. An electronic device comprising the battery according to claim 1.
14. An electric vehicle comprising:
    the battery according to claim 1;
    a converter configured to convert an electric power supplied from the battery to a driving force.
15. A power storage system comprising:
    the battery according to claim 1,
    at least an electric device to which an electric power is configured to be supplied from the battery; and
    a controller configured to control the supply of an electric power from the battery to the electric device.

* * * * *